United States Patent
Nishioka et al.

(10) Patent No.: US 9,993,776 B2
(45) Date of Patent: Jun. 12, 2018

(54) SEPARATION MEMBRANE MODULE, METHOD FOR DRIVING SAME, SEPARATION MEMBRANE ELEMENT, THRUST LOAD MAINTAINING MEMBER, AND THRUST LOAD ADJUSTMENT MAINTAINING MEMBER

(71) Applicant: TORAY INDUSTRIES, INC., Tokyo (JP)

(72) Inventors: Shinji Nishioka, Ehime (JP); Gentaro Horikawa, Ehime (JP); Koji Fujiwara, Ehime (JP); Kazuya Sugita, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 141 days.

(21) Appl. No.: 15/022,757

(22) PCT Filed: Sep. 17, 2014

(86) PCT No.: PCT/JP2014/074600
§ 371 (c)(1),
(2) Date: Mar. 17, 2016

(87) PCT Pub. No.: WO2015/041263
PCT Pub. Date: Mar. 26, 2015

(65) Prior Publication Data
US 2016/0207003 A1    Jul. 21, 2016

(30) Foreign Application Priority Data

Sep. 17, 2013  (JP) .................................. 2013-191601

(51) Int. Cl.
*B01D 63/02*   (2006.01)
*B01D 35/00*   (2006.01)
(Continued)

(52) U.S. Cl.
CPC ............ *B01D 65/02* (2013.01); *B01D 63/10* (2013.01); *B01D 63/106* (2013.01); *B01D 63/12* (2013.01);
(Continued)

(58) Field of Classification Search
CPC ...... B01D 63/10; B01D 63/12; B01D 63/106; C02F 1/444
See application file for complete search history.

(56) References Cited

U.S. PATENT DOCUMENTS 4,944,877 A * 7/1990 Maples .................. B01D 63/10
                                                          210/321.74
5,128,037 A * 7/1992 Pearl ..................... B01D 61/10
                                                          210/321.74
(Continued)

FOREIGN PATENT DOCUMENTS

CN       101115545 A    1/2008
JP        11197464        7/1999
(Continued)

OTHER PUBLICATIONS

Chinese Office Action with English language translation for Application No. 201480051215.4, dated Dec. 2, 2016, 23 pages.
(Continued)

*Primary Examiner* — Ana Fortuna
(74) *Attorney, Agent, or Firm* — RatnerPrestia

(57) ABSTRACT

The present invention relates to a separation membrane module including: a pressure vessel; a plurality of separation membrane elements which are provided in the pressure vessel and each includes: a wound membrane body in which a separation membrane, a liquid-to-be-treated channel member and a permeated liquid channel member are spirally wound around a permeated liquid collection tube; and anti-telescoping plates disposed on both ends of the wound (Continued)

membrane body; and a thrust load holding member which holds a thrust load generated when water passes through the separation membrane elements, in which a thrust load adjustment holding member which is capable of adjusting the thrust load by adjusting a total length of the separation membrane elements in the pressure vessel, is provided on at least one end of the thrust load holding member in an axial direction of the separation membrane elements.

18 Claims, 21 Drawing Sheets

(51) Int. Cl.
  *B01D 65/02* (2006.01)
  *B01D 63/10* (2006.01)
  *B01D 63/12* (2006.01)
(52) U.S. Cl.
  CPC .... *B01D 2313/02* (2013.01); *B01D 2313/025* (2013.01); *B01D 2319/02* (2013.01)

(56) References Cited

U.S. PATENT DOCUMENTS

| | | | | |
|---|---|---|---|---|
| 6,139,750 A * | 10/2000 | Graham | ............... | B01D 61/06 210/195.2 |
| 6,224,767 B1 * | 5/2001 | Fujiwara | ............... | B01D 53/22 210/232 |
| 6,402,956 B1 | 6/2002 | Andou | | |
| 6,423,230 B2 * | 7/2002 | Ilias | ............... | B01D 61/02 210/134 |
| 7,341,663 B2 * | 3/2008 | Offeman | ............... | B01D 61/246 210/321.6 |
| 8,940,169 B2 * | 1/2015 | Goebel | ............... | B01D 63/106 210/321.74 |
| 9,757,669 B2 * | 9/2017 | Johnson | ............... | B01D 29/016 |
| 2006/0124529 A1 | 6/2006 | Schott et al. | | |
| 2016/0207003 A1 * | 7/2016 | Nishioka | ............... | B01D 63/106 |

FOREIGN PATENT DOCUMENTS

| | | |
|---|---|---|
| JP | 2000271457 | 10/2000 |
| JP | 200450081 | 2/2004 |
| JP | 2009148691 | 7/2009 |
| JP | 2011045842 | 3/2011 |
| JP | 2012139614 | 7/2012 |
| WO | 2011024796 A1 | 3/2011 |

OTHER PUBLICATIONS

International Search Report for International Application No. PCT/JP2014/074600 dated Nov. 11, 2014.
Written Opinion of the International Searching Authority for International Application No. PCT/JP2014/074600 dated Nov. 11, 2014.
Notification of Reasons for Refusal for Japanese Application No. 2014-556291, dated Sep. 6, 2017, including English translation, 12 pages.
Saudi Arabian Examination Report for Saudi Arabian Application No. 516370749, dated Aug. 16, 2017, including English translation, 16 pages.

* cited by examiner

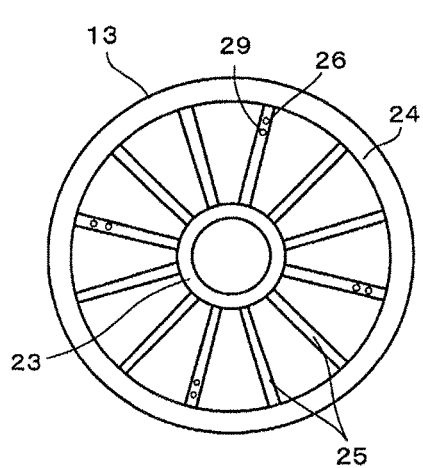
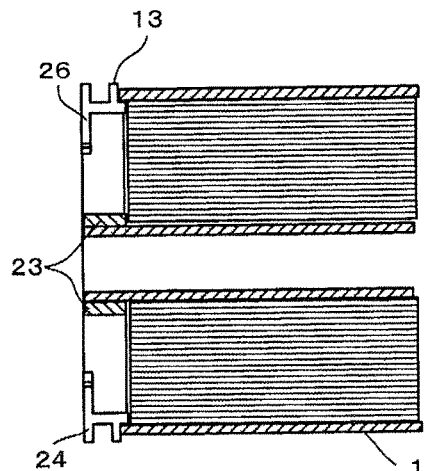
Fig. 20(a)  Fig. 20(b)
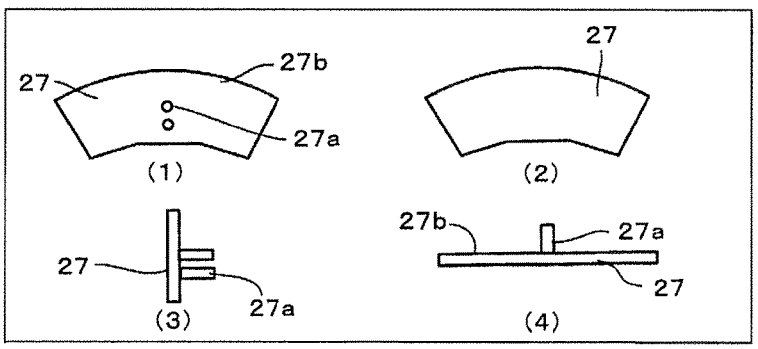
Fig. 20(c)
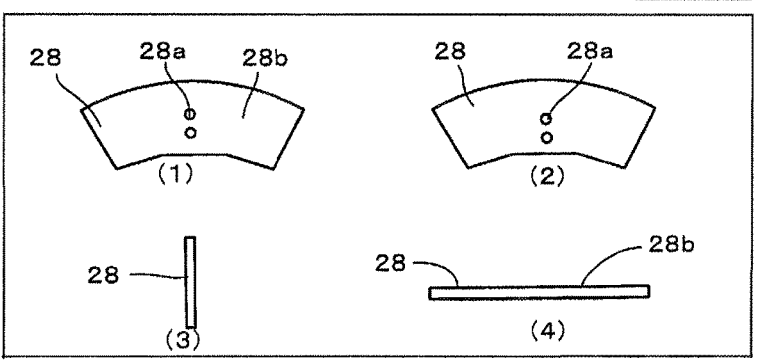
Fig. 20(d)

SEPARATION MEMBRANE MODULE, METHOD FOR DRIVING SAME, SEPARATION MEMBRANE ELEMENT, THRUST LOAD MAINTAINING MEMBER, AND THRUST LOAD ADJUSTMENT MAINTAINING MEMBER

CROSS REFERENCE TO RELATED APPLICATIONS

This is the U.S. National Phase application of PCT/JP2014/074600, filed Sep. 17, 2014, and claims priority to Japanese Patent Application No. 2013-191601, filed Sep. 17, 2013, the disclosures of each of these applications being incorporated herein by reference in their entireties for all purposes.

FIELD OF THE INVENTION

The present invention relates to a thrust load holding member which is used during operation of a plurality of separation membrane elements loaded in a pressure vessel.

BACKGROUND OF THE INVENTION

A separation membrane is used in a wide variety of fields such as desalination of seawater and brackish water, production of pure water and ultrapure water for medical/industrial use, effluent treatment, and the food industry. In separation treatment through the separation membrane, a separation membrane element using the separation membrane is widely used. In the separation membrane element, the separation membrane, a liquid-to-be-treated channel member, and a permeated liquid channel member are spirally wound around a permeated liquid collection tube, and anti-telescoping plates are disposed on both ends of the wound membrane body (for example, Patent Document 1).

The conventional technique is described with reference to FIGS. 1 to 4.

FIG. 1 is a schematic view illustrating a membrane separation system using a separation membrane element in the conventional technique. FIG. 2 is a partially cutout perspective view of the separation membrane element. A plurality of separation membrane elements 1 are individually loaded in series in a pressure vessel 2. Here, adjacent separation membrane elements 1 are interconnected with an interconnection member 4 which is freely inserted into and removed from a permeated liquid collection tube 12 which will be described in FIG. 2. Liquid to be treated (untreated liquid) is fed to the pressure vessel 2 in a state of being pressurized by a pump 3 and is separated into concentrated liquid and permeated liquid, through the separation membrane element 1. Permeated liquid adaptors 5 of the pressure vessel 2 both on the liquid-to-be-treated feed side and on the concentrated liquid discharge side are connected to the permeated liquid collection tube 12 of the separation membrane elements 1, and it is possible to discharge the permeated liquid obtained through the separation membrane elements 1 to the outside from the pressure vessel 2.

Each of the separation membrane elements 1 includes a brine seal 14 as a member which seals a gap between the pressure vessel 2 and the separation membrane element. Further, a thrust load holding member 7 is disposed most downstream in the pressure vessel 2 so as to hold a thrust load generated due to pressure drop occurring when the liquid to be treated flows through the separation membrane elements 1. Therefore, in general, a mechanism, in which the separation membrane element 1 positioned most downstream is brought into contact with the thrust load holding member without a gap, is formed. In the separation membrane element 1, a separation membrane 9 in which a permeated liquid channel member 10 is involved is spirally wound around the permeated liquid collection tube 12 through a liquid-to-be-treated channel member 11, and anti-telescoping plates 13 are disposed on both ends of the wound body.

In addition, the pressure vessel 2 is often manufactured so as to have an extra space of about 5 mm to 30 mm added to a total length calculated from the number of loaded separation membrane elements 1 such that a plurality of separation membrane elements 1 can be loaded, even when there is a total length tolerance of the separation membrane elements 1. However, when the separation membrane elements 1 are operated in a state where such a gap is remained as it is, the separation membrane elements 1 move or vibrate within a range of the extra space due to a change in pressure or flow occurring when the operation is started or finished, which results in damage to the permeated liquid adaptor 5 and damage to a seal member 18 mounted on the permeated liquid adaptor 5. In order to prevent the damage, a plurality of movement preventive members 8 having a thickness of 1 mm to 5 mm are mounted on the permeated liquid adaptor 5 so as to fill the extra space for preventing the separation membrane elements 1 from moving.

When a membrane separation treatment, in which a liquid to be treated passes through the separation membrane elements 1 loaded in the pressure vessel 2, is continually performed, contaminants in the liquid to be treated are attached and become accumulated on a membrane surface in the separation membrane element 1. Therefore, a function of the separation membrane element 1 deteriorates, and performance deterioration such as a water permeability decrease or water quality degradation of the permeated liquid occurs. In addition, a channel used when the liquid to be treated flows through the separation membrane element 1 is narrowed due to the contaminants, thereby increasing pressure drop, in some cases. In particular, the contaminants are often attached and become accumulated on the membrane surface on the liquid-to-be-treated side of the separation membrane element 1 positioned most upstream in the pressure vessel 2.

Conventionally, when the contaminants are attached and become accumulated on the membrane surface in the separation membrane element 1, thereby resulting in performance deterioration of the separation membrane element 1, in general, in order to remove the contaminants attached on the membrane surface, a method (forward flushing) in which a flushing liquid such as an acidic solution or an alkaline solution is caused to flow into the separation membrane element 1 from the upstream side to the downstream side of the pressure vessel 2, namely in the same direction as the direction of the membrane separation treatment, and the membrane surface is cleaned, has been used for recovering the performance of the separation membrane element 1.

However, in the cleaning method described above, a problem arises in that not only it is not possible to discharge, to the outside of the system, the contaminants attached to the separation membrane element 1 on the upstream side because the contaminants are caught along with the flushing liquid inside the separation membrane element 1 on the downstream side which is not contaminated with the contaminants, but also the separation membrane element 1 on the downstream side becomes contaminated. Hence, cases of using a cleaning method (backward flushing) in which the flushing liquid flows from the concentrate discharge side to the liquid-to-be-treated feed side of the pressure vessel 2, namely, in the backward direction opposite to the direction of the normal membrane separation treatment, or a cleaning method in which the forward flushing and the backward flushing are combined, are increased.

In a case of performing such backward flushing, among the separation membrane elements 1 in the pressure vessel 2, a thrust load generated due to the pressure drop occurring during the backward flushing is applied to the separation membrane element 1 on the liquid-to-be-treated feed side; however, since the thrust load holding member 7 for holding the thrust load is not disposed on the liquid-to-be-treated feed side of the pressure vessel 2, the thrust load is applied to the permeated liquid adaptor 5 and the permeated liquid collection tube 12 on the liquid-to-be-treated feed side, thereby resulting in damage to these members. Therefore, in order to apply the backward flushing, the same thrust load holding member 7 as that on the concentrated liquid discharge side also needs to be disposed on the liquid-to-be-treated feed side in the pressure vessel 2.

PATENT DOCUMENT

Patent Document 1: JP-A-2012-139614

SUMMARY OF THE INVENTION

As described above, conventionally, the forward flushing has been used in order to remove the contaminants attached and accumulated on the separation membrane elements 1 loaded in the pressure vessel 2; however, the cleaning of the separation membrane element 1 may be performed by using the cleaning method in which the backward flushing having higher effect is used, or in which the forward flushing and the backward flushing are combined.

FIG. 3 is a schematic view illustrating a water flow (thrust load) direction when the forward flushing is performed in a separation membrane module 15 in which the plurality of separation membrane elements 1 are loaded in the pressure vessel 2. FIG. 4 is a schematic view illustrating a water flow (thrust load) direction when the backward flushing is performed in the separation membrane module 15.

During the forward flushing as illustrated in FIG. 3, since a thrust load of the flushing liquid is applied to the concentrated liquid discharge side in the pressure vessel 2, an outer circumferential sectional surface of the anti-telescoping plate 13 is brought into close contact with the thrust load holding member 7 disposed on the concentrated liquid discharge side, whereby the thrust load generated in the separation membrane module 15 is received. In addition, the movement preventive member 8 of the separation membrane elements 1 is disposed on the liquid-to-be-treated feed side, whereby the separation membrane elements 1 are prevented from moving in the pressure vessel 2.

However, according to knowledge of the present inventors, as illustrated in FIG. 4, since the thrust load of the flushing liquid generated during the backward flushing is applied in the direction opposite to that of the forward flushing, the thrust load needs to be held by the anti-telescoping plate 13 of the separation membrane element 1 facing the liquid-to-be-treated feed side. Since the movement preventive member 8 of the separation membrane elements 1 during the normal membrane separation treatment is disposed on the liquid-to-be-treated feed side as described above, a gap A is likely to be formed between the thrust load holding member 7 disposed on the liquid-to-be-treated feed side and the anti-telescoping plate 13 of the separation membrane element 1, thereby making it not possible to receive the thrust load by the outer circumferential sectional surface of the anti-telescoping plate 13. Therefore, there is a concern that, during the backward flushing, damage will be caused to a connection section of the pressure vessel 2 on the liquid-to-be-treated feed side with the separation membrane element 1, namely the permeated liquid collection tube 12 or the permeated liquid adaptor 5 of the separation membrane element 1 on the liquid-to-be-treated feed side.

As described above, in a case of performing not only the membrane separation treatment or the forward flushing, but also the backward flushing is performed in the separation membrane module 15, it is ideal to dispose the movement preventive member 8 at the connection section of the pressure vessel 2 with the permeated liquid adaptor 5 of the separation membrane element 1 on the liquid-to-be-treated feed side and furthermore, to dispose a member having a large outer diameter for preventing movement, between the thrust load holding member 7 and the outer ring sectional surface of the anti-telescoping plate 13, whereby not only a purpose of preventing the movement is achieved, but also a function of receiving the thrust load is performed.

Patent Document 1 proposes that the thrust load holding member 7 for receiving the thrust load during the backward flushing is disposed on the liquid-to-be-treated feed side; however, as described above, since the thrust load is applied to the connection section of the pressure vessel 2 with the separation membrane element 1, the permeated liquid adaptor 5 and the permeated liquid collection tube 12 are likely to be damaged, because Patent Document 1 does not perform a measure for filling the gap formed between the thrust load holding member 7 and the anti-telescoping plate 13 of the separation membrane element 1 on the liquid-to-be-treated feed side in the pressure vessel 2.

Hence, the present invention includes providing a separation membrane module and an operation method thereof, a separation membrane element, a thrust load holding member and a thrust load adjustment holding member, which have a function of holding a thrust load generated under any condition and are capable of performing movement prevention in a pressure vessel, in a case where either a membrane separation treatment or forward flushing and backward flushing are performed in the separation membrane module.

In order to solve the above-mentioned problem, the present invention includes providing the following techniques (1) to (17).

(1) A separation membrane module including:
  a pressure vessel;
  a plurality of separation membrane elements which are provided in the pressure vessel and each including:
    a wound membrane body in which a separation membrane, a liquid-to-be-treated channel member and a permeated liquid channel member are spirally wound around a permeated liquid collection tube; and
    anti-telescoping plates disposed on both ends of the wound membrane body; and
  a thrust load holding member which holds a thrust load generated when water passes through the separation membrane elements,
  in which a thrust load adjustment holding member which is capable of adjusting the thrust load by adjusting a total length of the separation membrane elements in the pressure vessel, is provided on at least one end of the thrust load holding member in an axial direction of the separation membrane elements.

(2) The separation membrane module according to (1), in which the thrust load holding member transmits the thrust load of the separation membrane element to an end plate of the pressure vessel through the thrust load adjustment holding member.
(3) The separation membrane module according to (1), in which the thrust load holding member transmits the thrust load of the separation membrane element to a pressure vessel adaptor provided on an end plate of the pressure vessel through the thrust load adjustment holding member.
(4) The separation membrane module according to any one of (1) to (3), in which the thrust load holding member has any shape selected from a hollow polygonal column shape, a cylindrical shape and a cone shape without an apex portion thereof.
(5) The separation membrane module according to any one of (1) to (4), in which the thrust load holding member holds a load transmitted from an outer ring of the anti-telescoping plate of the separation membrane element, on a separation membrane element side.
(6) The separation membrane module according to any one of (1) to (5), in which the thrust load adjustment holding member has a hollow polygonal plate shape or a hollow disk shape, and is formed of a plurality of members which are mountable on the anti-telescoping plate of the separation membrane element.
(7) A method for operating a separation membrane module, in which a liquid to be treated is fed to the separation membrane module according to any one of (1) to (6) from a liquid-to-be-treated feed port and is treated through the separation membrane, permeated liquid is discharged from a permeated liquid discharge port, and concentrated liquid is discharged from a concentrated liquid discharge port, the method including:
a step of disposing the thrust load holding member and the thrust load adjustment holding member on at least an upstream side in the pressure vessel;
a step of feeding a flushing liquid from the concentrated liquid discharge port; and
a step of performing flushing in which the flushing liquid is discharged from the liquid-to-be-treated feed port.
(8) A separation membrane element which is used in a set of a plurality of the elements loaded in a pressure vessel, the separation membrane element including:
a wound membrane body in which a separation membrane, a liquid-to-be-treated channel member and a permeated liquid channel member are spirally wound around a permeated liquid collection tube; and
anti-telescoping plates disposed on both ends of the wound membrane body,
in which the anti-telescoping plate has an inner ring and an outer ring, and
the separation membrane element has a thrust load adjustment holding member mounting section on which a thrust load adjustment holding member, which comes into close contact with the outer ring and which is capable of adjusting a thrust load generated when water passes through the separation membrane elements by adjusting a total length of the separation membrane elements, is mountable.
(9) The separation membrane element according to (8), in which the anti-telescoping plate includes:
the inner ring; and
a plurality of spokes radially extend from the inner ring to an outer side, and
in which the outer ring is adjacent to each of the plurality of spokes.
(10) The separation membrane element according to (9), in which at least one of the spokes has, as the thrust load adjustment holding member mounting section, an individual thrust load adjustment holding member mounting section which enables the individual spoke to hold the thrust load adjustment holding member.
(11) The separation membrane element according to (9) or (10), in which two or more of the spokes have, as the thrust load adjustment holding member mounting section, a transverse spoke thrust load adjustment holding member mounting section which enables the plurality of spokes to hold the thrust load adjustment holding member.
(12) The separation membrane element according to any one of (8) to (11), in which the thrust load adjustment holding member mounting section has at least one mounting hole.
(13) A thrust load holding member mounted on a separation membrane module including:
a plurality of separation membrane elements which are provided in a pressure vessel and each includes:
a wound membrane body in which a separation membrane, a liquid-to-be-treated channel member and a permeated liquid channel member are spirally wound around a permeated liquid collection tube; and
anti-telescoping plates disposed on both ends of the wound membrane body,
in which the thrust load holding member holds a thrust load generated when water passes through the separation membrane elements, and
in which the thrust load holding member transmits the thrust load of the separation membrane elements to a pressure vessel adaptor provided on an end plate of the pressure vessel.
(14) The thrust load holding member according to (13), which holds a load transmitted from an outer ring of the anti-telescoping plate, on a separation membrane element side.
(15) The thrust load holding member according to (13) or (14), which has any shape selected from a hollow polygonal column shape, a cylindrical shape and a cone shape without an apex portion thereof.
(16) A thrust load adjustment holding member, in which, in a separation membrane module including:
a pressure vessel;
a plurality of separation membrane elements which are provided in the pressure vessel and each includes:
a wound membrane body in which a separation membrane, a liquid-to-be-treated channel member and a permeated liquid channel member are spirally wound around a permeated liquid collection tube; and
anti-telescoping plates disposed on both ends of the wound membrane body; and
a thrust load holding member which holds a thrust load generated when water passes through the separation membrane elements,
the thrust load adjustment holding member is mounted on at least one end of the thrust load holding member in an axial direction of the separation membrane elements, and adjusts the thrust load by adjusting a total length of the separation membrane elements in the pressure vessel.
(17) The thrust load adjustment holding member according to (16), which has a hollow polygonal plate shape or a hollow disk shape.

According to a separation membrane module and an operation method thereof, a separation membrane element, a thrust load holding member and a thrust load adjustment holding member of the present invention, it is possible to receive a thrust load during backward flushing while preventing the separation membrane element from moving in a pressure vessel, it is possible to prevent a permeated liquid adaptor, a seal member, a permeated liquid collection tube or the like, from being damaged, and furthermore, it is possible to easily switch between a membrane separation treatment, forward flushing, and backward flushing.

BRIEF DESCRIPTION OF THE DRAWINGS

FIG. 8 illustrate views of a third embodiment of a thrust load holding member 7 and a thrust load adjustment holding member 21 according to the present invention.

FIG. 15 illustrate views of the thrust load adjustment holding member and the anti-telescoping plate in FIG. 14.

FIG. 16 illustrate views of an example of a second example of the thrust load adjustment holding member and the anti-telescoping plate on which the thrust load adjustment holding member is mounted, according to the present invention.

FIG. 17 illustrate views of an example of a third example of the thrust load adjustment holding member and the anti-telescoping plate on which is the thrust load adjustment holding member is mounted, according to the present invention.

FIG. 18 illustrate views of an example of a fourth example of the thrust load adjustment holding member and the anti-telescoping plate on which the thrust load adjustment holding member is mounted, according to the present invention.

FIG. 19 illustrate views of an example of a fifth example of the thrust load adjustment holding member and the anti-telescoping plate on which the thrust load adjustment holding member is mounted, according to the present invention.

FIG. 20 illustrate views of an example of a sixth example of the thrust load adjustment holding member and the anti-telescoping plate on which the thrust load adjustment holding member is mounted, according to the present invention: FIG. 20(a) is a front view of an anti-telescoping plate; FIG. 20(b) is a partial sectional view of a separation membrane element; FIG. 20(c) illustrates views of a thrust load adjustment holding adjustment member attaching member; (1) in FIG. 20(c) is a front view, (2) in FIG. 20(c) is a rear view, (3) in FIG. 20(c) is a side view, and (4) in FIG. 20(c) is a plan view; and FIG. 20(d) illustrates views of an adjustment member; (1) in FIG. 20(d) is a front view, (2) in FIG. 20(d) is a rear view, (3) in FIG. 20(d) is a side view, and (4) in FIG. 20(d) is a plan view.

FIG. 21 illustrate views of an example of a seventh example of the thrust load adjustment holding member and the anti-telescoping plate on which the thrust load adjustment holding member is mounted, according to the present invention.

DETAILED DESCRIPTION OF EMBODIMENTS OF THE INVENTION

Figure 1:
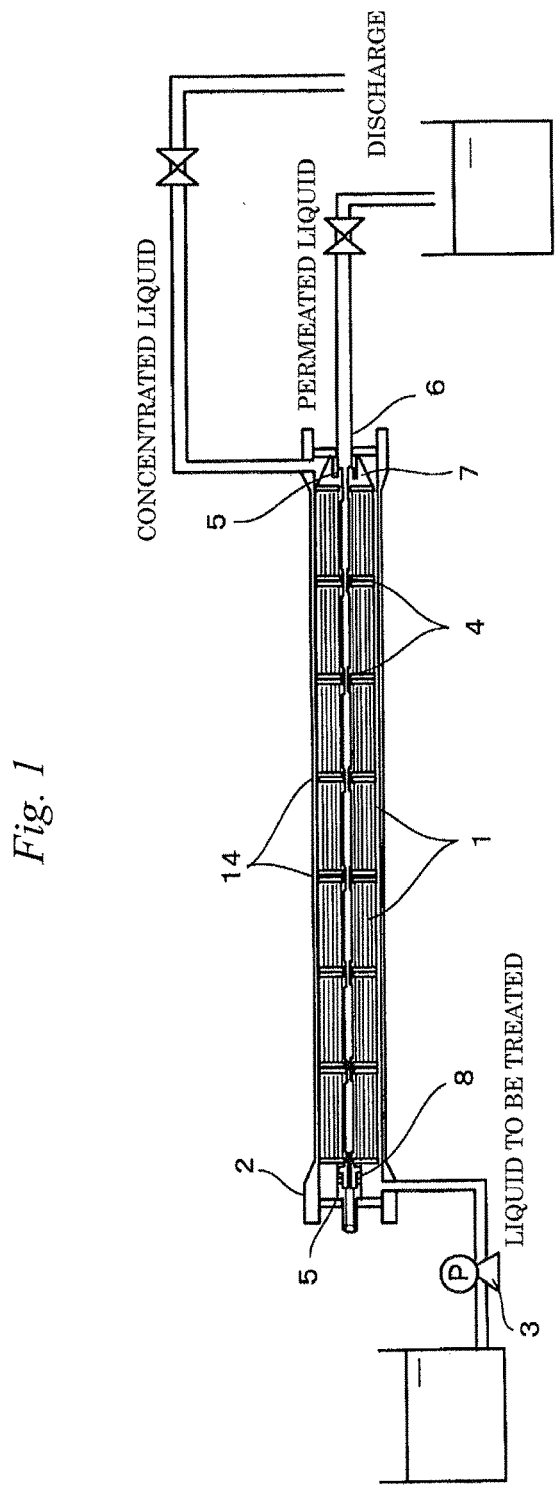
FIG. 1 is a schematic view of water treatment device using a separation membrane element in the conventional technique.

Hereinafter, embodiments of the present invention will be described in detail with reference to FIGS. 5 to 21; however, the present invention is not limited to the embodiments illustrated in the drawings.

Fundamental concepts of the present embodiment will be described with reference to FIGS. 1 to 4 of the conventional technique.

Figure 2:
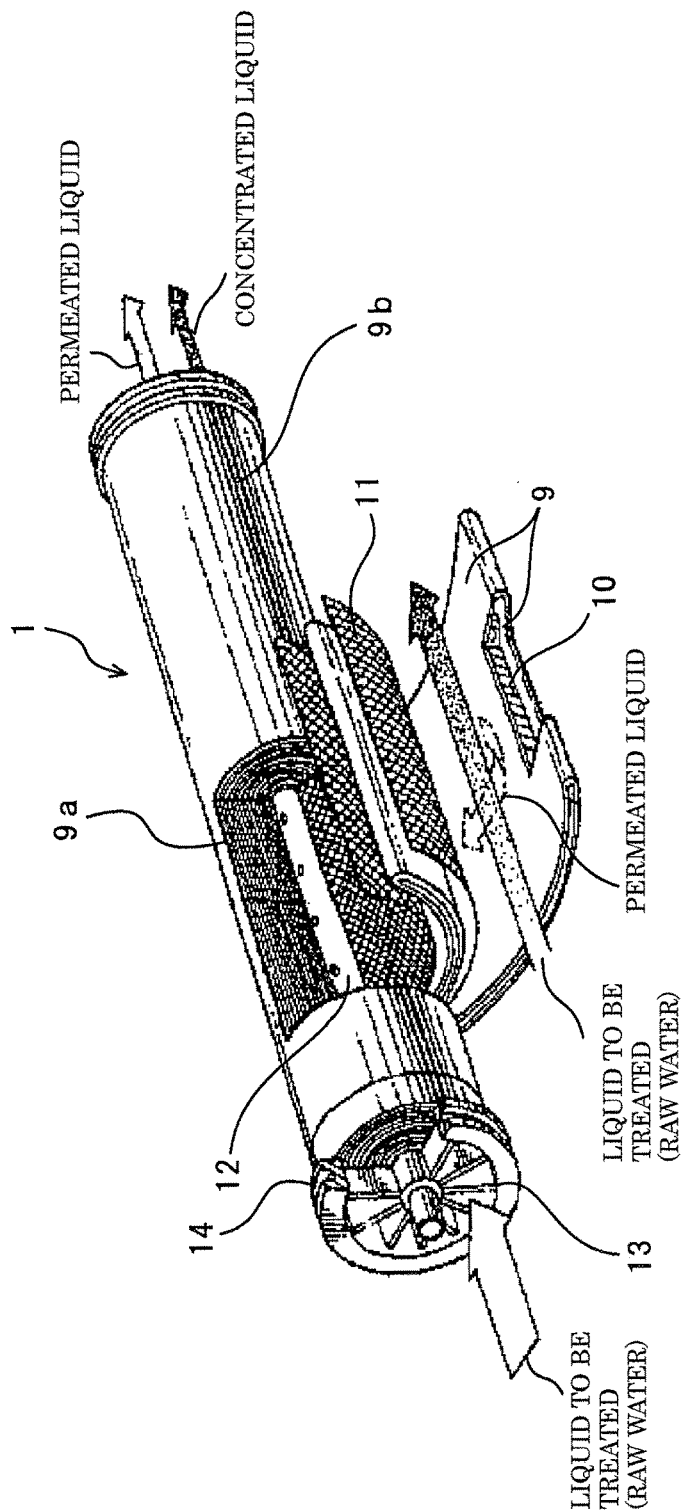
FIG. 2 is a partially cutout perspective view of a spiral type separation membrane element in the conventional technique.
Figure 3:
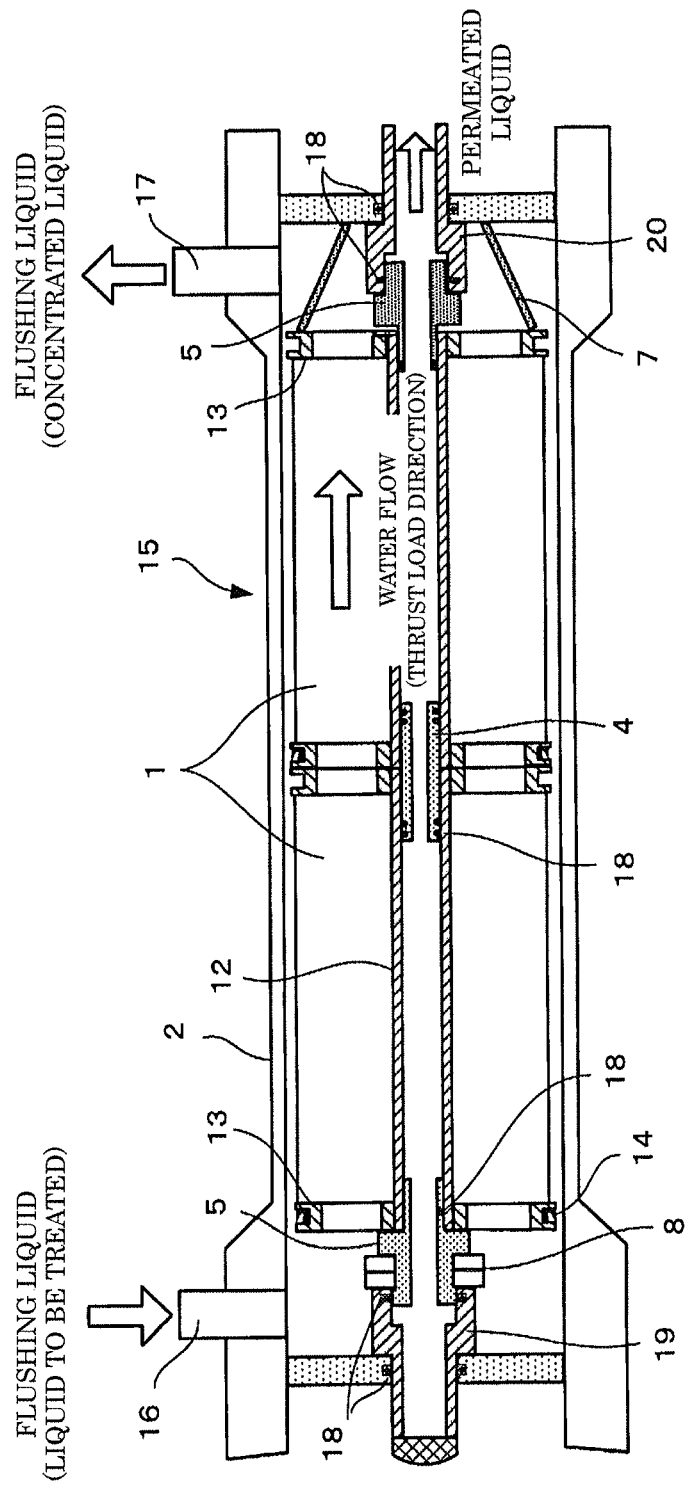
FIG. 3 is a schematic view illustrating a direction of a thrust load generated when forward flushing is performed in the conventional technique.
Figure 4:
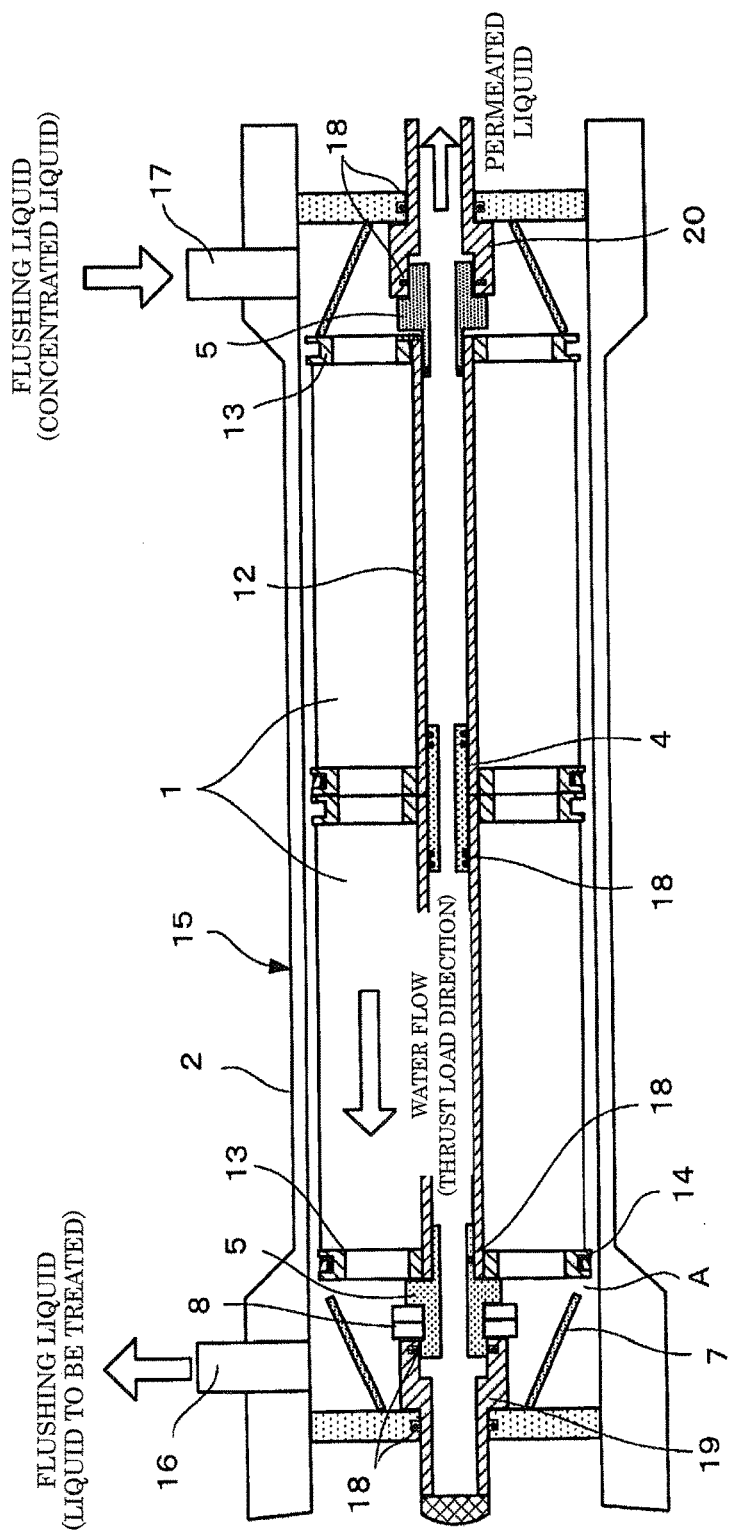
FIG. 4 is a schematic view illustrating a direction of a thrust load generated when backward flushing is performed in the conventional technique.

An example of a separation membrane element of the present embodiment will be described on the basis of FIG. 2. A separation membrane element 1 has a structure in which an envelope-shaped separation membrane 9 in which a permeated liquid channel member 10 is involved is spirally wound around a permeated liquid collection tube 12 through a liquid-to-be-treated channel member 11 (mesh spacer), and anti-telescoping plates 13 are disposed on both ends of a wound membrane body 9a. An exterior body 9b is further provided on the exterior side of the wound membrane body 9a, and the anti-telescoping plate 13 is fixed by the exterior body 9b, thereby forming the integral structure.

In the separation membrane element 1 of the present embodiment, there is no particular limitation on a function of filtration, as long as the anti-telescoping plates 13 are disposed on the ends of the wound membrane body 9a as described above. For example, the separation membrane element may be a spiral type reverse osmosis membrane element, a spiral type nanofiltration membrane element, or a spiral type ultrafiltration membrane element. In addition, examples of a material of the separation membrane 9 include a cellulose acetate-based polymer, polyamide, polyester, polyimide, and a vinyl polymer.

As illustrated in FIG. 1, the separation membrane element 1 has a brine seal 14 on one end of the separation membrane element 1, and a plurality of the separation membrane element 1 are accommodated in a pressure vessel 2 of water treatment device. Thus, a liquid to be treated is fed in the pressure vessel 2, in a state of being pressurized by a pump 3, and is separated into permeated liquid and concentrated liquid. The permeated liquid passes in the envelope-shaped separation membrane 9 and is discharged through the permeated liquid collection tube 12. The concentrated liquid passes through the liquid-to-be-treated channel member 11 and is discharged to the outside of the pressure vessel 2. In the present embodiment, an example in which a plurality of separation membrane units including the separation membrane 9, the permeated liquid channel member 10, and the liquid-to-be-treated channel member 11 are wound around the permeated liquid collection tube 12, is described; however, a single separation membrane unit may be wound around the permeated liquid collection tube 12.

In addition, in the present embodiment, when the plurality of separation membrane units are loaded in the pressure vessel 2 as illustrated in FIG. 1, adjacent separation membrane elements 1 are interconnected to each other through an interconnection member 4 which is internally or externally fitted to and is freely inserted into and removed from the permeated liquid collection tube 12 of both the separation membrane elements 1 and, thus, the respective separation membrane elements 1 are interconnected to one another. In addition, the pressure vessel 2 and the separation membrane element 1 are connected by a permeated liquid adaptor 5 on the upstream side of the permeated liquid collection tube 12 with respect to the separation membrane element 1 positioned on the liquid-to-be-treated feed side, and the liquid to be treated is blocked from flowing into the permeated liquid collection tube 12. Furthermore, the downstream side of the permeated liquid collection tube 12 of the separation membrane element 1 positioned on the concentrated liquid discharge side is interconnected to a permeated liquid discharge piping 6 of the pressure vessel 2 by the permeated liquid adaptor 5.

Figure 5:
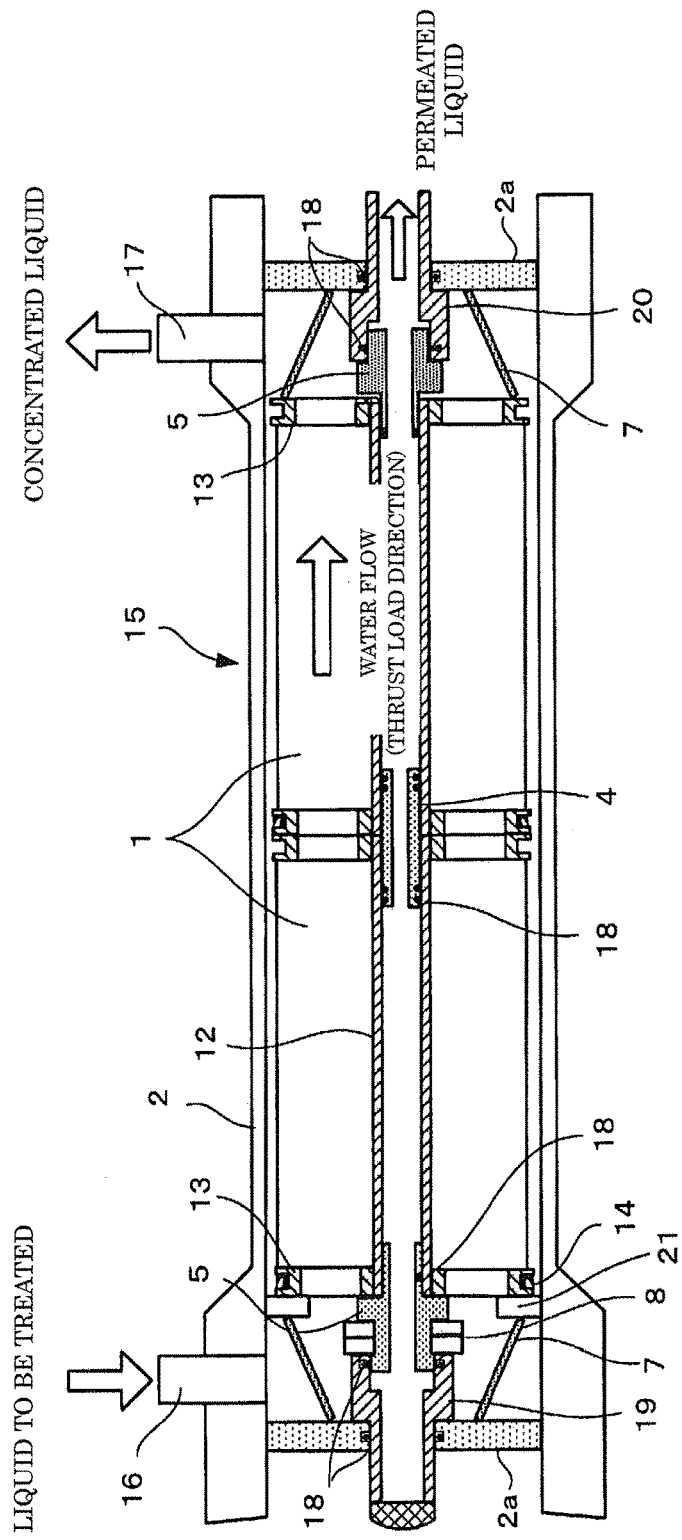
FIG. 5 is a schematic view of a separation membrane module on which a thrust load holding member and a thrust load adjustment holding member according to an embodiment of the present invention are mounted.

FIG. 5 is a schematic view of a separation membrane module 15 on which a thrust load holding member 7 and a thrust load adjustment holding member 21 are disposed. The liquid to be treated, which is fed from a liquid-to-be-treated feed port 16, is subjected to a membrane separation treatment in the separation membrane elements 1 and is discharged from a concentrated liquid discharge port 17. In addition, the separated permeated liquid is discharged through the permeated liquid collection tube 12. The permeated liquid adaptor 5 connected with the separation membrane element 1 on the liquid-to-be-treated feed side in the pressure vessel 2 is interconnected to a liquid-to-be-treated feed side pressure vessel adaptor 19 of the pressure vessel 2, which has a sealed tip provided on an end plate 2a of the pressure vessel 2. In addition, the permeated liquid adaptor 5 connected to the separation membrane element 1 on the concentrated liquid discharge side in the pressure vessel 2 is interconnected to a permeated liquid discharge-side pressure vessel adaptor 20 which discharges the permeated liquid to the outside of a system of the pressure vessel 2. Seal members 18 are mounted on the respective connection members, namely the interconnection member 4, the permeated liquid adaptor 5, the liquid-to-be-treated feed side pressure vessel adaptor 19 and the permeated liquid discharge-side pressure vessel adaptor 20 are sealed, respectively, so as to prevent a solution from mixing or leaking.

In addition, the thrust load holding member 7 which can hold a thrust load generated during a membrane separation treatment or forward flushing, is disposed on the concentrated liquid discharge side in the pressure vessel 2. In addition, a movement preventive member 8 of the separation membrane elements 1 is mounted on the permeated liquid adaptor 5 on the liquid-to-be-treated feed side in the pressure vessel 2 so as to prevent movement of the separation membrane elements 1 in the pressure vessel 2 due to a flow change or vibrations of water at the time of operation start or operation stop of the separation membrane module 15.

In general, the thrust load holding member 7 is a supplementary component of the pressure vessel 2 and the shape thereof varies depending on each pressure vessel 2; however, the thrust load holding member has a mechanism for achieving a purpose of receiving a load by an outer ring 24, which will be described below, of the anti-telescoping plate 13 of the spiral type separation membrane element 1, and, in general, the thrust load holding member has a hole for causing fluid to pass through such that the liquid to be treated or the concentrated liquid which is to be discharged from the spiral type separation membrane element 1 is not blocked from being discharged to the outside of the system of the pressure vessel 2. In addition, there is no particular limitation on a material of the thrust load holding member 7, as long as the thrust load holding member has the mechanism described above; however, in general, a polyvinyl chloride (PVC) resin or an acrylonitrile butadiene styrene (ABS) copolymer is used.

As described above, when the membrane separation treatment is continually performed in the separation membrane element 1, contaminants are attached and become accumulated on a membrane surface in the separation membrane element 1, which results in deterioration of functions of the separation membrane element 1. In particular, numerous contamination components exist in the separation membrane element 1 close to the liquid-to-be-treated feed side in the separation membrane module 15.

The attached and accumulated contamination components are removed through cleaning by feeding a flushing liquid, which contains a chemical agent having an effect of removing according to a type of the component, into the separation membrane module 15, whereby performance of the separation membrane element 1 is restored.

The contamination components herein mean substances which are attached and become accumulated on a membrane surface in the separation membrane element 1 and causes deterioration of performance of the separation membrane element 1. Examples of the contamination components include a suspended substance, a colloid, an organic substance, a microorganism, and metabolites from the microorganism in the feed liquid. In addition, there is no particular limitation on the type of flushing liquid, as long as the liquid has an effect of removing the contamination component. Examples of the liquid may include the permeated liquid obtained after the separation treatment, an alkali solution in which alkaline chemicals such as sodium hydroxide are dissolved, and an acid solution in which acidic chemicals such as sulfuric acid or an organic acid are dissolved.

Further, there is no particular limitation on a flushing method, as long as a flushing liquid is fed. For example, the flushing liquid may be fed at lower pressure or a lower flowing amount than that during the membrane separation treatment, or may be fed at higher pressure or a higher flowing amount than that during the membrane separation treatment. In addition, the flushing liquid may be continuously circulated, or stopping and circulation of the flushing liquid may be repeatedly performed.

Even though the thrust load adjustment holding member 21 and the thrust load holding member 7 are mounted on the upstream side of the separation membrane module 15, it is possible to perform the operation as before since the members have a hole for causing fluid to pass through.

Figure 6:
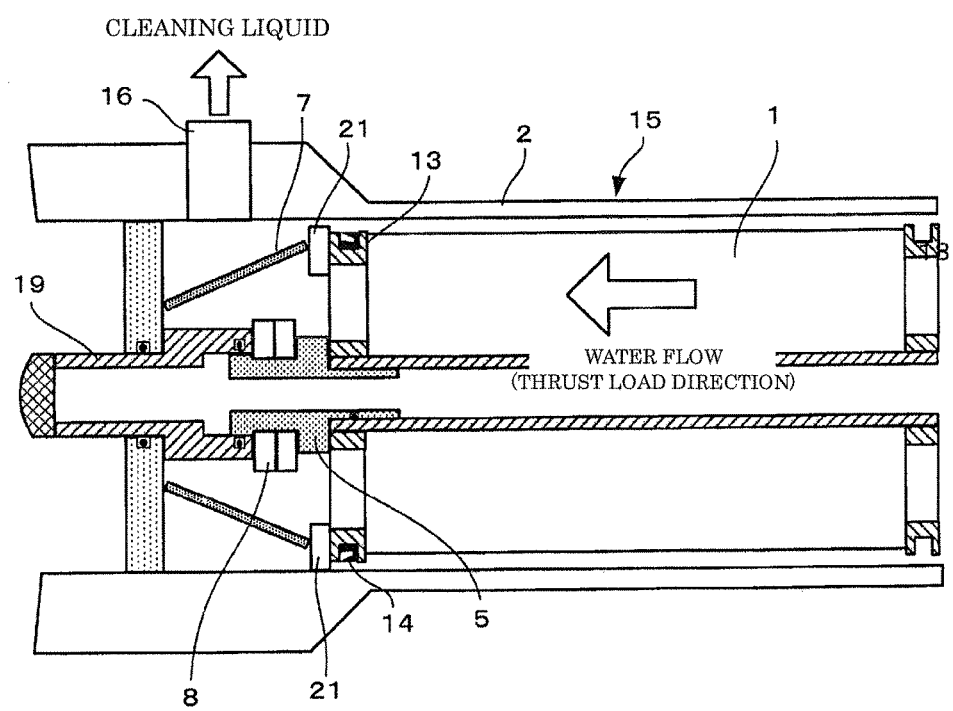
FIG. 6 is a partial sectional view schematically showing a separation membrane module illustrating an example of a first embodiment of the thrust load holding member and the thrust load adjustment holding member according to the present invention.

FIG. 6 is a partial sectional view schematically showing the separation membrane module 15 illustrating a first embodiment of the thrust load holding member 7 and the thrust load adjustment holding member 21.

In the separation membrane module 15 in which the thrust load adjustment holding member 21 is mounted between the anti-telescoping plate 13 of the separation membrane element 1 and the thrust load holding member 7 on the liquid-to-be-treated feed side in the pressure vessel 2, a thrust load direction during backward flushing is illustrated. The thrust load holding member 7 transmits the thrust load of the separation membrane elements 1 to the end plate 2a of the pressure vessel 2 through the thrust load adjustment holding member 21. The thrust load adjustment holding member 21 fills a gap between the anti-telescoping plate 13 and the thrust load holding member 7 such that the thrust load adjustment holding member comes into contact with the outer ring 24 of the anti-telescoping plate 13 of the separation membrane element 1. Hence, the thrust load holding member receives the thrust load generated due to pressure drop occurring when water flows during the backward flushing.

In addition, there is no particular limitation on the shape of the thrust load adjustment holding member 21 of the present embodiment and the member may have a cylindrical shape or a fan shape; however, the outer diameter of the thrust load adjustment holding member 21 needs to be smaller than the inner diameter of the pressure vessel 2, and it is possible to easily perform mounting and the operation of the thrust load adjustment holding member when the member has the same outer diameter as that of the separation membrane element 1. The thickness of one piece of the member is 1 mm to 5 mm and the adjustment is easily performed using a plurality of thrust load adjustment holding members. In addition, regarding a disposing method thereof, the thrust load adjustment holding member may have a shape matching the shape of the anti-telescoping plate 13 of the separation membrane element 1 and may be fixed thereto, may be fixed to one end of the thrust load holding member 7, or may not be fixed. In the case of fixing, a method of fixing using an adhesive or the like may be employed; however, in this case, it is desirable that a sparingly soluble adhesive is used so as to avoid being dissolved in the flushing liquid. In addition, in another fixing method, the thrust load adjustment holding member may have a recessed portion or a projection portion which matches the shape of the thrust load holding member 7 or the separation membrane element 1 such that the thrust load adjustment holding member may be fixed thereto so as to be fitted therein. In the present embodiment, the thrust load holding member 7 holds the thrust load at the outer ring 24 of the anti-telescoping plate 13 of the separation membrane element 1; however, a mode of holding the thrust load at an inner ring 23 or a spoke 25 thereof may also be employed.

Figure 7:
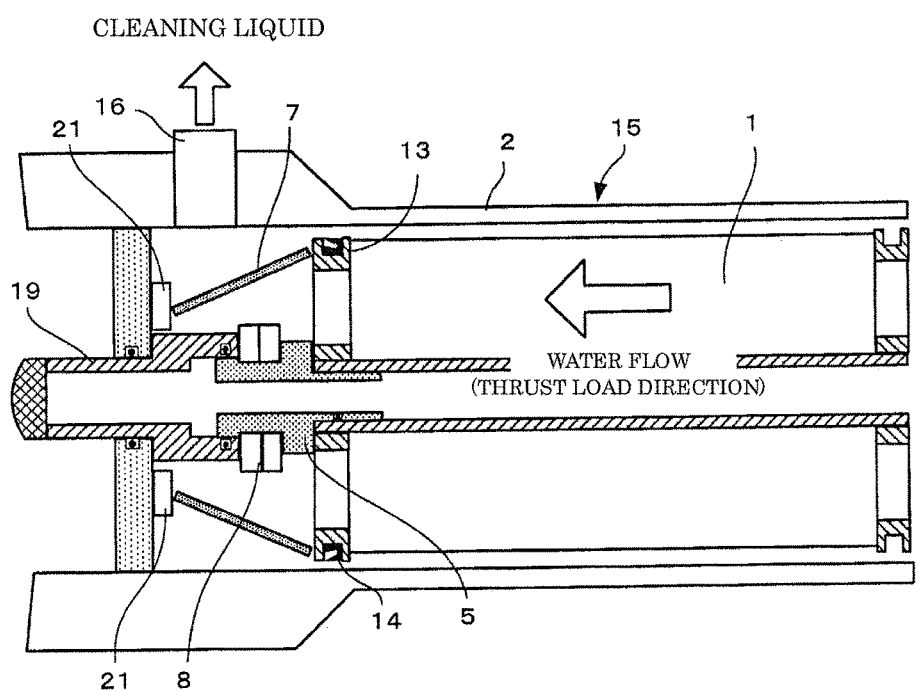
FIG. 7 is a partial sectional view schematically showing a separation membrane module illustrating an example of a second embodiment of the thrust load holding member and the thrust load adjustment holding member according to the present invention.

FIG. 7 is a partial sectional view schematically showing the separation membrane module 15 illustrating a second embodiment of the thrust load holding member 7 and the thrust load adjustment holding member 21.

In the second embodiment, the thrust load adjustment holding member 21 is disposed so as to fill the gap between the end plate 2a of the pressure vessel 2 and the thrust load holding member 7; however, adjustment is performed such that one end of the thrust load holding member 7 comes into contact with the outer ring 24 of the anti-telescoping plate 13 of the separation membrane element 1. Hence, similar to the first embodiment, the thrust load holding member receives the thrust load generated due to pressure drop occurring when water flows during the backward flushing.

In this embodiment, the inner diameter of the thrust load adjustment holding member 21 needs to be greater than the outer diameter of the liquid-to-be-treated feed side pressure vessel adaptor 19 and needs to be smaller than the inner diameter of the top surface of a hollow cone body without an apex portion of the thrust load holding member 7. In addition, it is preferable that the outer diameter of the thrust load adjustment holding member 21 is smaller than the inner diameter of the pressure vessel 2 and is greater than the inner diameter of the outer ring 24 of the anti-telescoping plate 13 of the loaded separation membrane element 1.

Figure 8A:
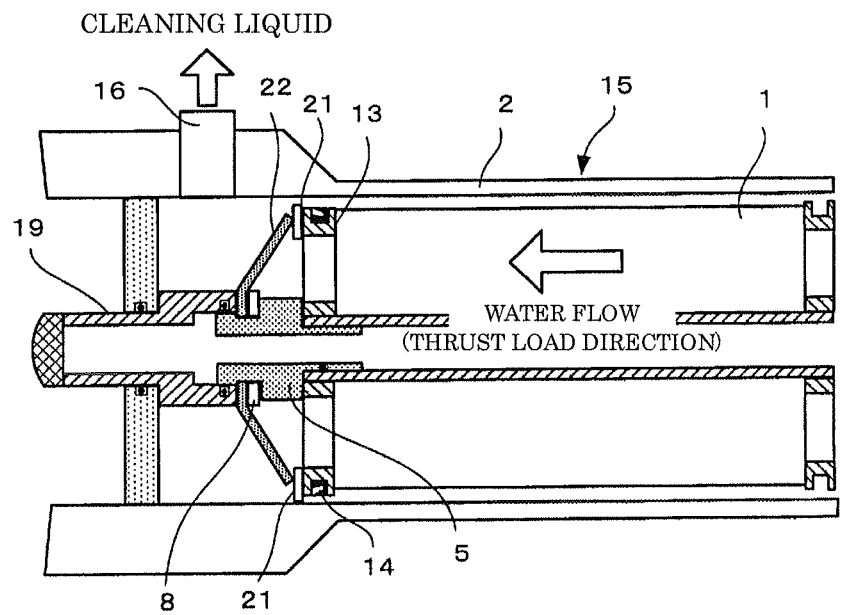
FIG. 8(a) is a partial sectional view schematically showing a separation membrane module 15.
Figure 8B:
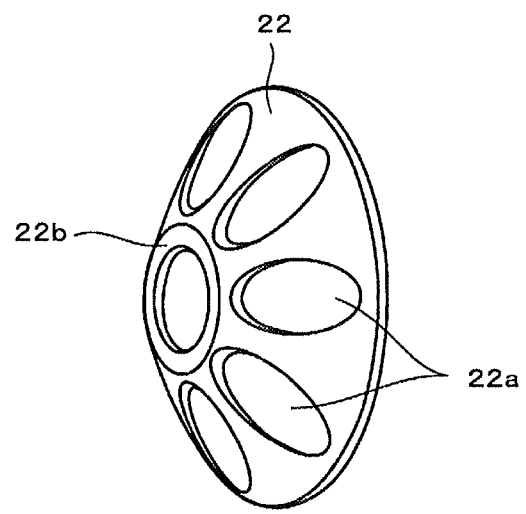
FIG. 8(b) illustrates another example of the thrust load holding member 7.

FIG. 8 illustrate views of a third embodiment of the thrust load holding member 7 and the thrust load adjustment holding member 21; FIG. 8(*a*) is a partial sectional view schematically showing the separation membrane module 15, and FIG. 8(*b*) illustrates another example of the thrust load holding member 7. In FIGS. 8 to 13, a thrust load holding member 22 is described as the other example of the thrust load holding member 7 described above.

The thrust load holding member 22 in the third embodiment has a substantially cone shape without an apex portion thereof, which has a plurality of holes 22*a* for causing fluid to pass through, and a flat base plate section 22*b* is provided on the top instead of the apex portion such that the base plate section 22*b* is interposed between the movement preventive member 8 and the liquid-to-be-treated feed side pressure vessel adaptor 19. In addition, in the embodiment, the thrust load holding member has the cone shape; however, the member may have a hollow polygonal column shape angulated between the holes 22*a*. The thrust load applied to the separation membrane elements 1 is received by the outer ring 24 of the anti-telescoping plate 13 of the separation membrane element 1 and the end portion of the liquid-to-be-treated feed side pressure vessel adaptor 19 at which the end plate 2*a* of the pressure vessel 2 and the permeated liquid collection tube 12 of the separation membrane element 1 are interconnected. In addition, the movement preventive member 8 is disposed in a gap between the thrust load holding member 22 and the permeated liquid adaptor 5.

Similar to the first embodiment, in the mode in the third embodiment, the thrust load adjustment holding member 21 fills the gap between the anti-telescoping plate 13 and the thrust load holding member 7 such that the thrust load holding member comes into contact with the outer ring of the anti-telescoping plate 13 of the separation membrane element 1. Hence, the thrust load holding member receives the thrust load generated due to pressure drop occurring when water flows during the backward flushing.

Figure 9:
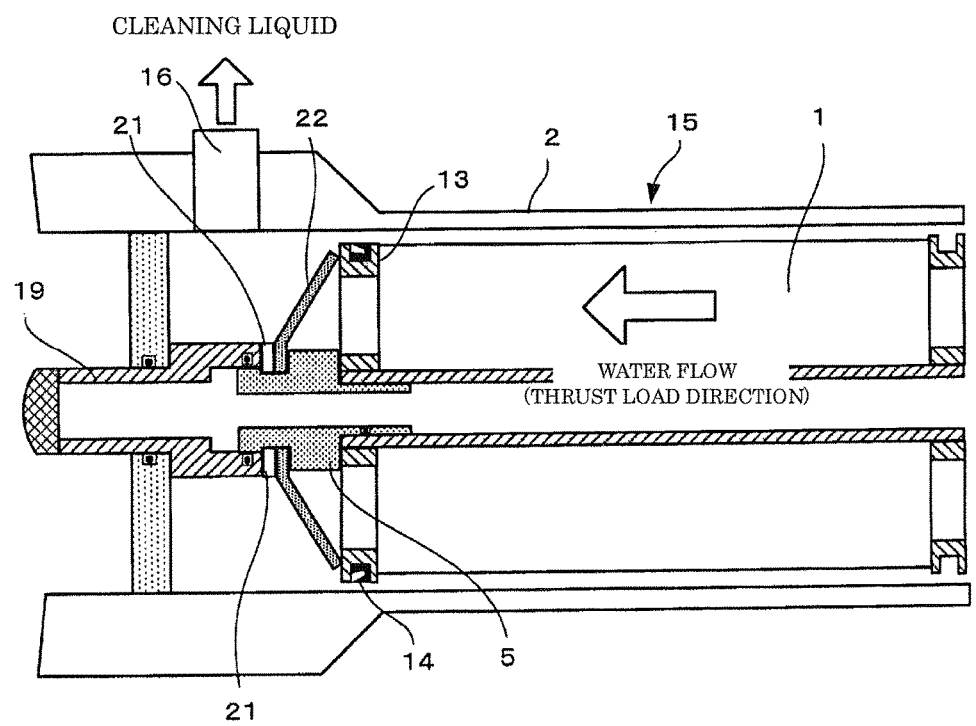
FIG. 9 is a partial sectional view schematically showing a separation membrane module illustrating an example of a fourth embodiment of the thrust load holding member and the thrust load adjustment holding member according to the present invention.

FIG. 9 is a partial sectional view schematically showing the separation membrane module 15 illustrating a fourth embodiment of the thrust load holding member 22 and the thrust load adjustment holding member 21.

Similar to the third embodiment, in the fourth embodiment, the thrust load applied to the separation membrane elements 1 is received by the outer ring 24 of the anti-telescoping plate 13 of the separation membrane element 1 and the end portion of the liquid-to-be-treated feed side pressure vessel adaptor 19 at which the end plate 2*a* of the pressure vessel 2 and the permeated liquid collection tube 12 of the separation membrane elements 1 are interconnected. In other words, the thrust load holding member 22 transmits the thrust load of the separation membrane elements 1 to the pressure vessel adaptor 19 disposed on the end plate 2*a* of the pressure vessel 2, through the thrust load adjustment holding member 21. The thrust load adjustment holding member 21 is disposed so as to fill the gap between the thrust load holding member 22 and the end portion of the adaptor at which the end plate 2*a* of the pressure vessel 2 is interconnected to the collection tube of the separation membrane elements 1; however, one end of the thrust load holding member 7 is adjusted so as to come into contact with the outer ring 24 of the anti-telescoping plate 13 of the separation membrane element 1. Hence, similar to the first embodiment, the thrust load adjustment holding member receives the thrust load generated due to pressure drop occurring when water flows during the backward flushing.

Similar to the first embodiment, there is no limitation on a shape or a disposing method of the thrust load adjustment holding member 21 described as an example of the second to fourth embodiments.

In addition, the total length of the thrust load holding member 22 of the present embodiment in the flow direction is caused to be equal to a length of a projection portion of the permeated liquid adaptor 5 in the flow direction, and, as in the present embodiment, there is no need to provide another holding member between the anti-telescoping plate 13 of the separation membrane elements 1 and the thrust load holding member 22 of the present embodiment such that simplification of mounting is achieved. As the shape of the thrust load holding member 22, the inner diameter of the top surface of the hollow cone body without an apex portion is greater than the inner diameter of the liquid-to-be-treated feed side pressure vessel adaptor 19 and is smaller than the outer diameter thereof. In addition, it is preferable that the outer diameter of the bottom of the hollow cone body without an apex portion is smaller than the inner diameter of the pressure vessel 2 and is greater than the inner diameter of the outer ring 24 of the anti-telescoping plate 13 of the loaded separation membrane element 1. Further, as a condition, a hole for causing fluid to pass through needs to be formed.

Figure 10:
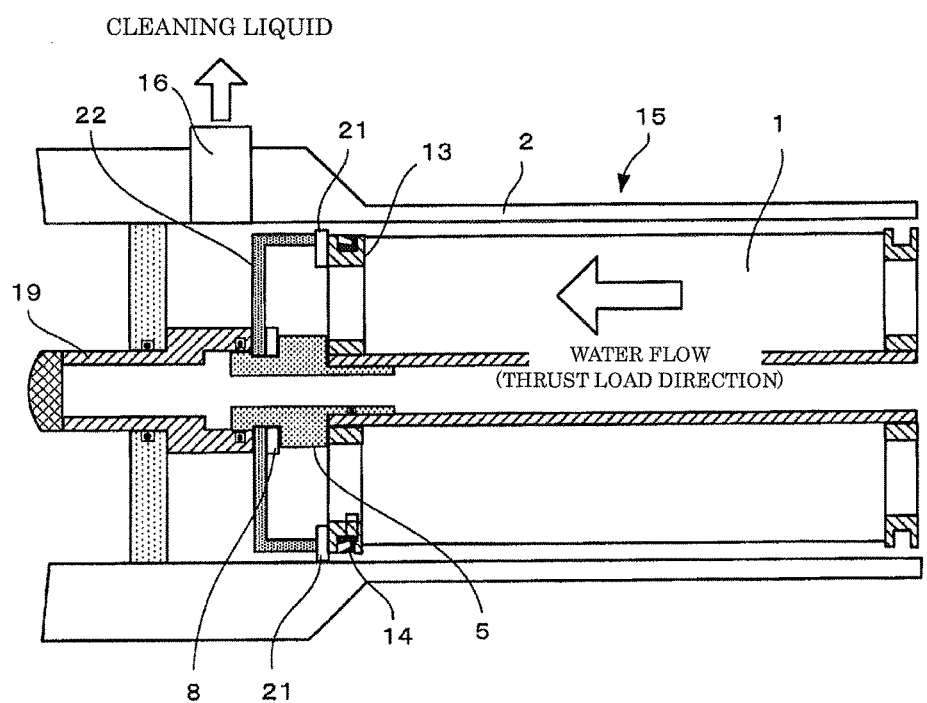
FIG. 10 is a partial sectional view schematically showing a separation membrane module illustrating an example of a fifth embodiment of the thrust load holding member and the thrust load adjustment holding member according to the present invention.
Figure 11:
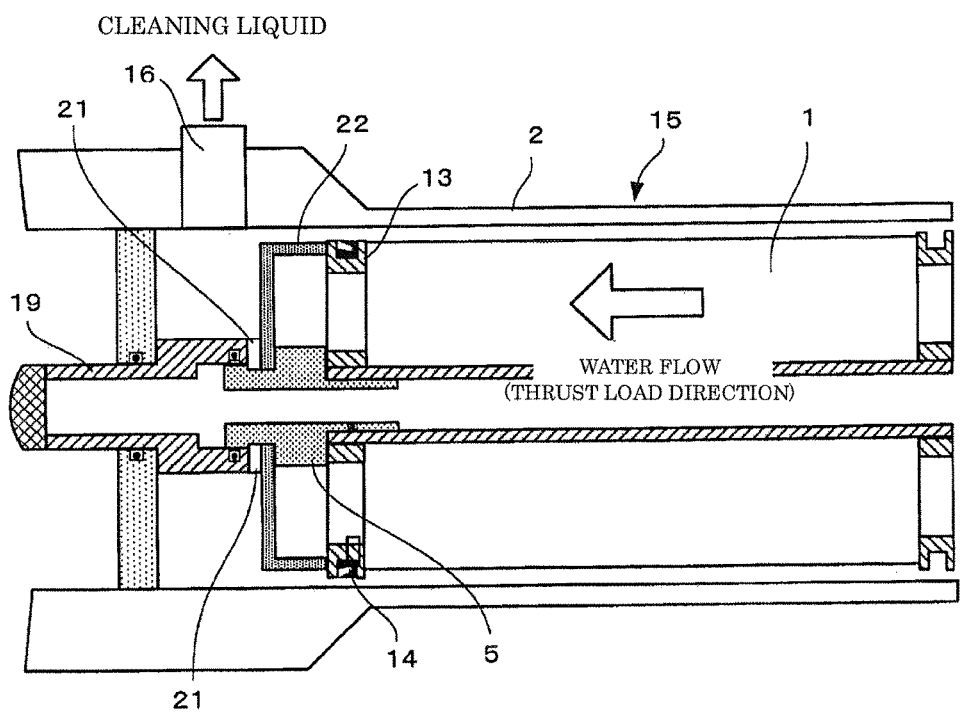
FIG. 11 is a partial sectional view schematically showing a separation membrane module illustrating an example of a sixth embodiment of the thrust load holding member and the thrust load adjustment holding member according to the present invention.
Figure 12:
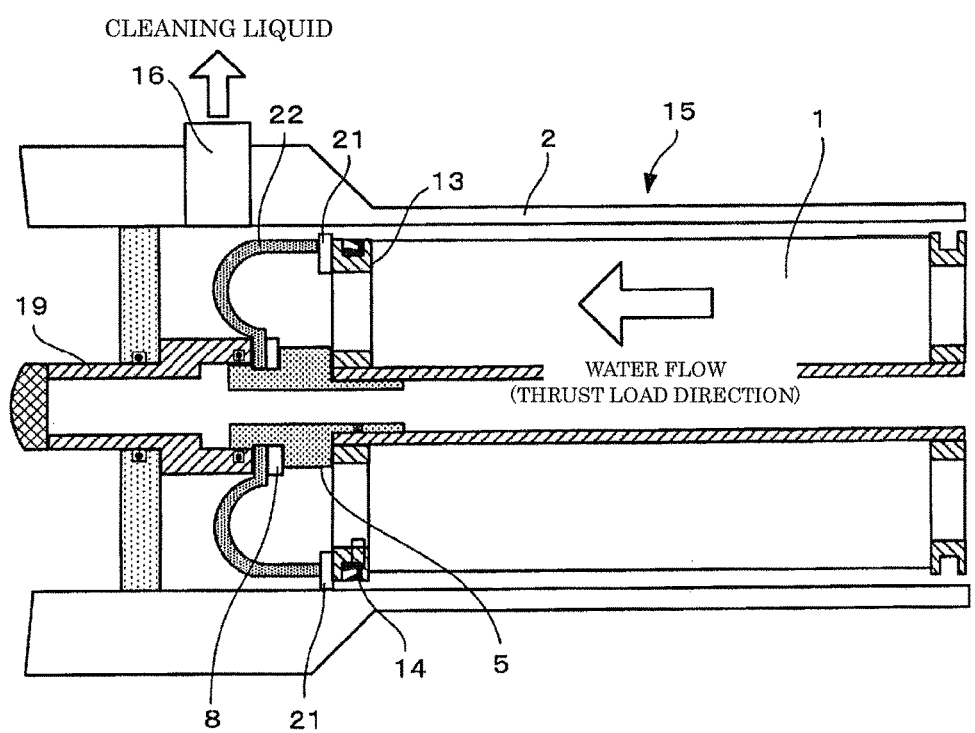
FIG. 12 is a partial sectional view schematically showing a separation membrane module illustrating an example of a seventh embodiment of the thrust load holding member and the thrust load adjustment holding member according to the present invention.
Figure 13:
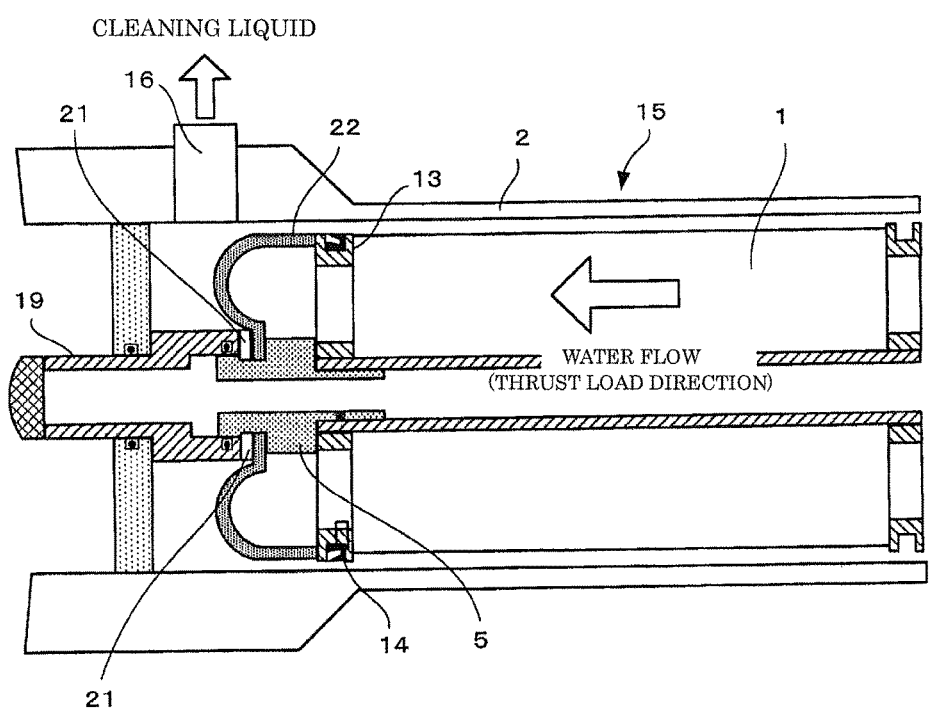
FIG. 13 is a partial sectional view schematically showing a separation membrane module illustrating an example of an eighth embodiment of the thrust load holding member and the thrust load adjustment holding member according to the present invention.
Figure 14:
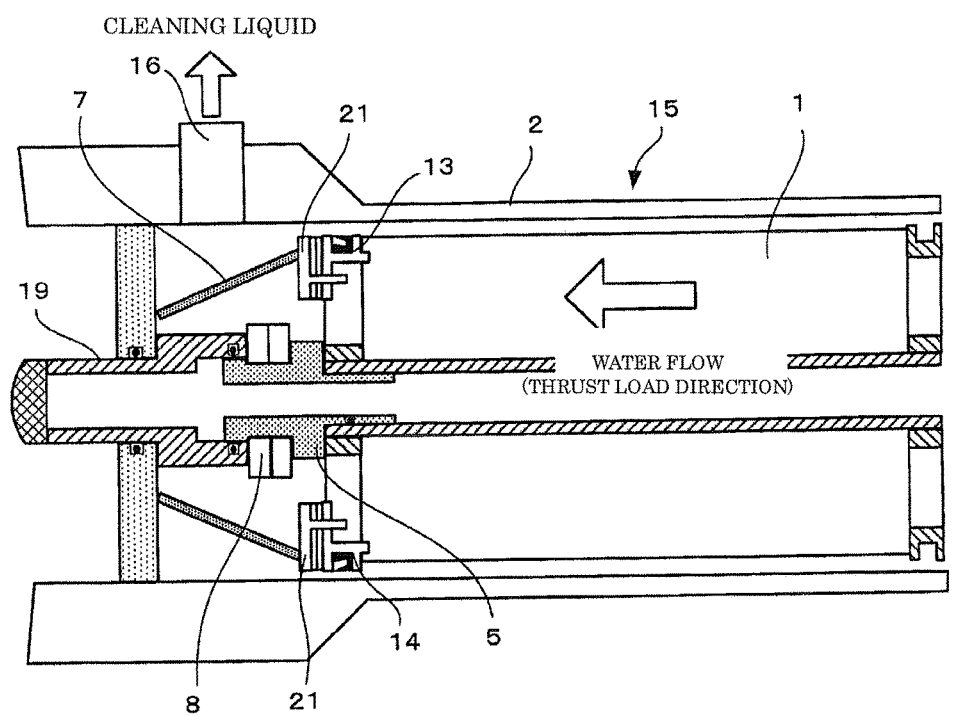
FIG. 14 is a partial sectional view schematically showing a separation membrane module illustrating an example of a first example of the thrust load adjustment holding member and an anti-telescoping plate on which the thrust load adjustment holding member is mounted, according to the present invention.

Besides, shapes as in FIGS. 10 to 13 are employed; however, there is no particular limitation on the shape as long as the mechanism described above is included. As a material of the thrust load holding member, there is no particular limitation as long as the mechanism described above is included; however in general, PVC or ABS is used. FIGS. 10 to 13 are partial sectional views schematically showing the separation membrane module 15 illustrating examples of fifth to eighth embodiments of the thrust load holding member 22 and the thrust load adjustment holding member 21. In FIG. 10 and FIG. 11, the thrust load holding member 22 has a cylindrical shape; in FIG. 10, similar to the first embodiment, the thrust load adjustment holding member 21 is disposed on the anti-telescoping plate 13 side, and, in FIG. 11, similar to the second embodiment, the thrust load adjustment holding member 21 is disposed on the liquid-to-be-treated feed side pressure vessel adaptor 19 side. Furthermore, in FIG. 12 and FIG. 13, the thrust load holding member 22 has a cup shape in a cross-sectional view; in FIG. 12, similar to the first embodiment, the thrust load adjustment holding member 21 is disposed on the anti-telescoping plate 13 side, and, in FIG. 13, similar to the second embodiment, the thrust load adjustment holding member 21 is disposed on the liquid-to-be-treated feed side pressure vessel adaptor 19 side.

In addition, in the embodiments described above, the thrust load adjustment holding member 21 is disposed on the most downstream side during the backward flushing, namely, disposed on the most upstream side during the membrane separation treatment or the forward flushing; however, there is no particular limitation on the position thereof as long as it is possible to fill the gap in the pressure vessel 2. For example, the thrust load adjustment holding member may be disposed on the most upstream side during the backward flushing, namely, disposed on the most downstream side during the membrane separation treatment or the forward flushing, or may be mounted between the plurality of spiral type separation membrane elements 1 loaded in the pressure vessel 2. Here, the thrust load adjustment holding member is mounted most downstream or most upstream during the backward flushing, whereby there is no need to consider the length of the interconnection member 4 for interconnecting the spiral type separation membrane elements 1 to one another so that there is no concern that quality of the permeated liquid will deteriorate due to the insufficient sealing of the interconnection section.

FIGS. 14 to 21 are views examples of the thrust load adjustment holding member 21 and the anti-telescoping plate 13 on which the thrust load adjustment holding member 21 is mounted. A first example will be described with reference to FIGS. 14 and 15.

The anti-telescoping plate 13 fixed to the end portion of the separation membrane element 1 includes the inner ring 23, the outer ring 24, and the spoke 25. The spoke 25 radially extends from the inner ring 23 to the outer side, and the outer ring 24 is adjacent to each of a plurality of the spokes 25. In the present example, the separation membrane element 1 includes a total length adjustment member mounting section 26 on which the thrust load adjustment holding member 21, which is contact with the outer ring 24 included in the anti-telescoping plate 1 and is capable of adjusting the total length of the separation membrane elements 1, is mountable.

The thrust load adjustment holding member 21 can be divided into a thrust load adjustment holding member attaching member 27 and an adjustment member 28. A single adjustment member 28 or a plurality of adjustment members 28 are mounted so as to match an extra space of the pressure vessel 2, thereby making it possible to adjust the total length of the separation membrane elements 1 and to fill the gap between the thrust load holding member 7 and the separation membrane element 1.

In addition, it is desirable that an area of both the thrust load adjustment holding member 21 and the total length adjustment member mounting section 26, with respect to one liquid-to-be-treated channel formed by the inner ring 23, the adjacent spokes 25 and the outer ring 24, is equal to or less than 50% of the one liquid-to-be-treated channel. With the area equal to or less than 50% thereof, it is possible to secure the liquid-to-be-treated channel and to suppress eccentric flow.

Figure 15A:
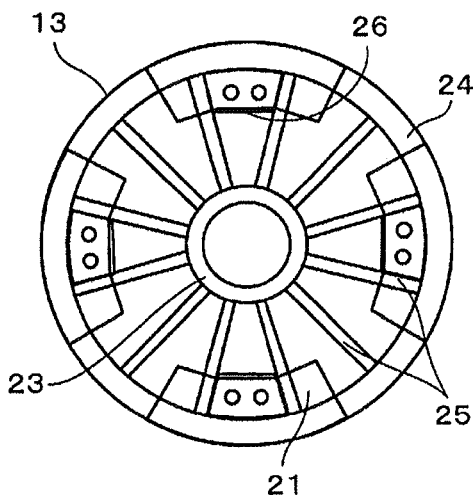
FIG. 15(a) is a front view of the anti-telescoping plate.
Figure 15B:
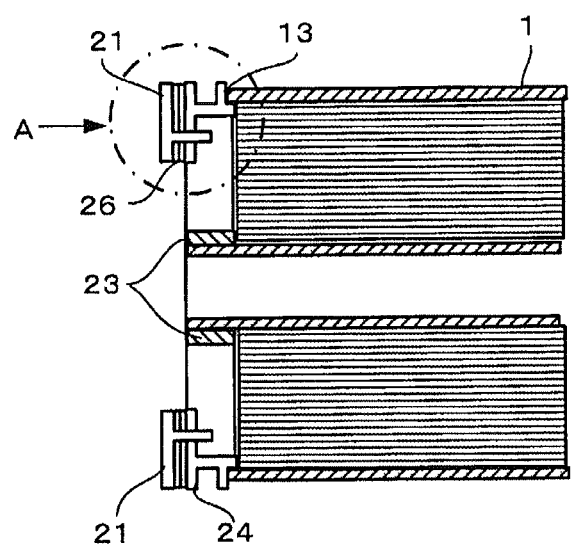
FIG. 15(b) is a partial sectional view of a separation membrane element.
Figure 15C:
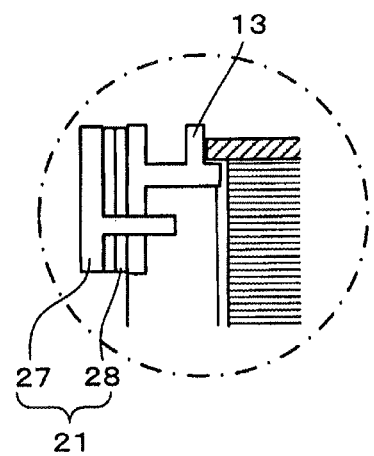
FIG. 15(c) is an enlarged view of section A in FIG. 15(b).

FIG. 15(a) is a front view of the anti-telescoping plate 13, FIG. 15(b) is a partial sectional view of the separation membrane element 1 and FIG. 15(c) is an enlarged view of section A in FIG. 15(b). The thrust load adjustment holding member 21 has an external appearance of a hollow polygonal plate shape or a hollow disk shape, is mounted on the anti-telescoping plate 13, and includes the thrust load adjustment holding member attaching member 27 and the adjustment member 28.

Figures 16A, 16B:
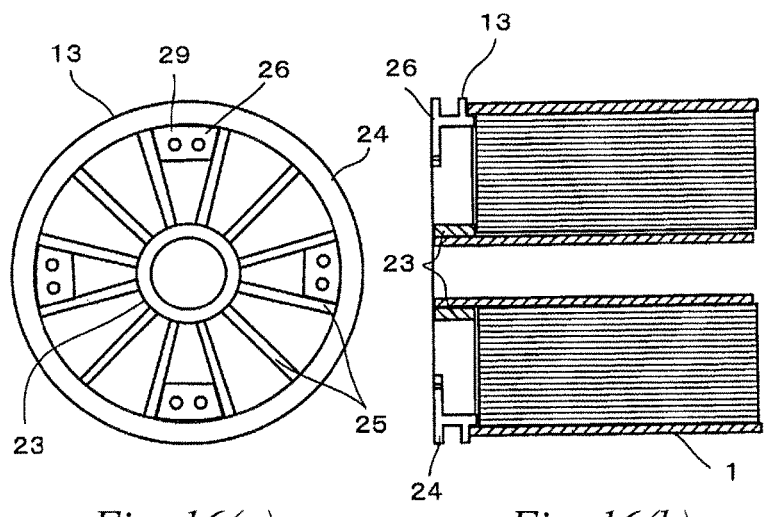
FIG. 16(a) is a front view of an anti-telescoping plate.
FIG. 16(b) is a partial sectional view of a separation membrane element.
Figure 16C:
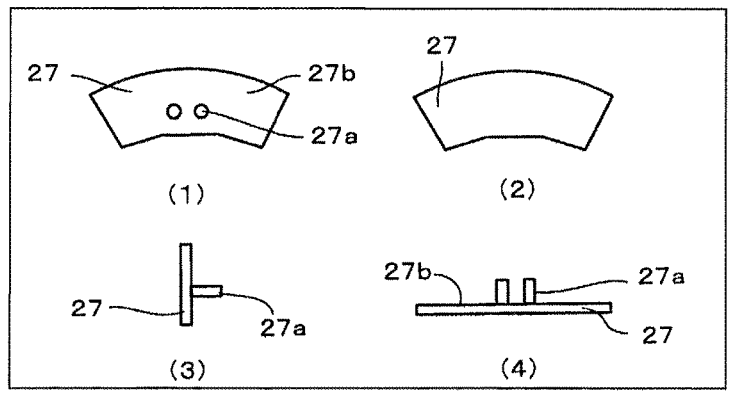
FIG. 16(c) illustrates views of a thrust load adjustment holding member attaching member; (1) in FIG. 16(c) is a front view, (2) in FIG. 16(c) is a rear view, (3) in FIG. 16(c) is a side view, and (4) in FIG. 16(c) is a plan view.
Figure 16D:
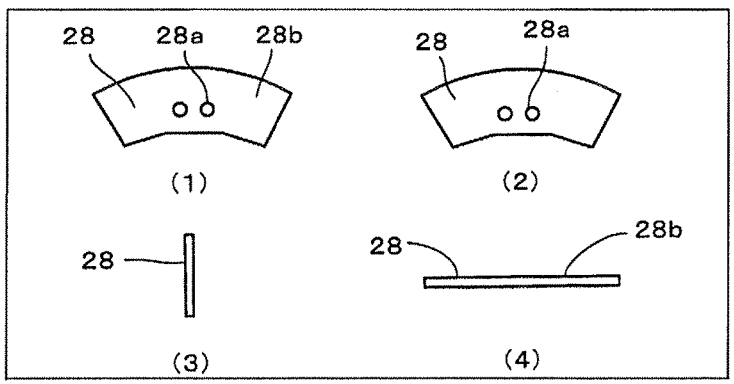
FIG. 16(d) illustrates views of an adjustment member; (1) in FIG. 16(d) is a front view, (2) in FIG. 16(d) is a rear view, (3) in FIG. 16(d) is a side view, and (4) in FIG. 16(d) is a plan view.

FIG. 16 illustrate views of an example of a second example of the thrust load adjustment holding member 21 and the anti-telescoping plate 13 on which the thrust load adjustment holding member 21 is mounted. In the first example, the thrust load adjustment holding member 21 is mounted on the anti-telescoping plate 13 so as to cover the plurality of spokes 25; however, in the second example, the thrust load adjustment holding member 21 is mounted between the spokes 25.

The thrust load adjustment holding member attaching member 27 and the adjustment member 28 of the thrust load adjustment holding member 21 are described in detail using the second example; however, a fundamental configuration is not different from the first example.

The thrust load adjustment holding member attaching member 27 has a thrust load adjustment holding member attachment mounting section 27a in a part thereof and further has a thrust load adjustment holding member attachment facing section 27b which comes into contact with the outer ring 24. In addition, the adjustment member 28 has an adjustment member mounting section 28a in a part thereof and has an adjustment member facing section 28b.

The thrust load adjustment holding member attachment mounting section 27a is engaged with and fixed to the total length adjustment member mounting section 26 included in the anti-telescoping plate 13 fixed to the end portion of the separation membrane element 1, thereby playing a role of filling the gap without moving despite of a flow change or vibrations of water at the time of operation start or operation stopping of the separation membrane module. In addition, a structure, in which the adjustment member mounting section 28a is fixed so as to be interposed between the thrust load adjustment holding member attaching member 27 and the total length adjustment member mounting section 26, is formed, thereby adjusting the total length by a single adjustment member 28 or a plurality of adjustment members 28 fixed and mounted so as to match the gap.

Further, the thrust load adjustment holding member attachment facing section 27b is brought into close contact with the outer ring 24 of the anti-telescoping plate 13, thereby making it possible for the thrust load holding member 7 to receive the thrust load generated during the backward flushing.

In addition, since the thrust load is received by the thrust load holding member 7 from the outer ring 24 of the anti-telescoping plate 13 of the separation membrane element 1 through the thrust load adjustment holding member attaching member 27 and the adjustment member 28, it is preferable that the thrust load adjustment holding member attachment mounting section 27a and the adjustment member mounting section 28a of the thrust load adjustment holding member attaching member 27 and the adjustment member 28 have the same cross-sectional view. It is more preferable that the thrust load adjustment holding member attaching member 27 have the same cross-sectional shape as that of the adjustment member 28.

There is no particular limitation on a total length adjustment member fixing section 29 as long as the total length adjustment member fixing section has a shape which is engaged with the thrust load adjustment holding member attachment mounting section 27a of the thrust load adjustment holding member attaching member 27.

In addition, there is no particular limitation on the material of the thrust load adjustment holding member 21. For example, a resin may be used, or plastics or metal such as SUS may be used.

The membrane separation treatment, the forward flushing and the backward flushing are performed using the separation membrane module 15, in which the plurality of separation membrane elements 1 mounting the thrust load adjustment holding member 21 which is capable of adjusting the total length described above, are loaded in the pressure vessel 2, thereby it is possible to receive the thrust load during the backward flushing, while preventing movement of the separation membrane elements 1 in the pressure vessel 2, it is possible to prevent damage to the permeated liquid adaptor 5 or a seal member, and further it is possible to easily switch between the membrane separation treatment, the forward flushing and the backward flushing.

OTHER EXAMPLES (1) In addition, in the first example described above, an example of a transverse spoke total length member mounting section in which the total length adjustment member mounting section 26 of the anti-telescoping plate 13 included in the separation membrane element 1 is crossed by the adjacent two spokes 25 is described; however, there is no particular limitation on the shape of the total length adjustment member mounting section 26 as long as the total length adjustment member mounting section has a function of being capable of fixing the thrust load adjustment holding member 21 thereto.

Figure 17A:
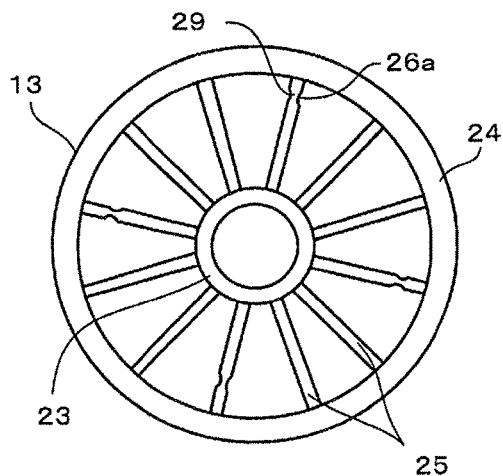
FIG. 17(a) is a front view of an anti-telescoping plate.
Figure 17B:
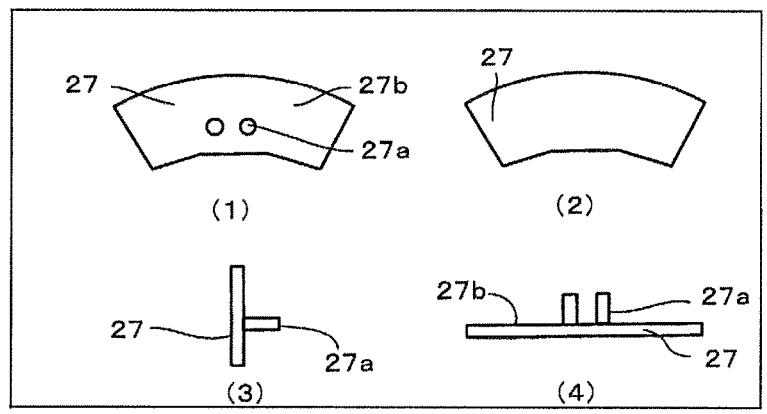
FIG. 17(b) illustrates views of a thrust load adjustment holding member attaching member; (1) in FIG. 17(b) is a front view, (2) in FIG. 17(b) is a rear view, (3) in FIG. 17(b) is a side view, and (4) in FIG. 17(b) is a plan view.
Figure 17C:
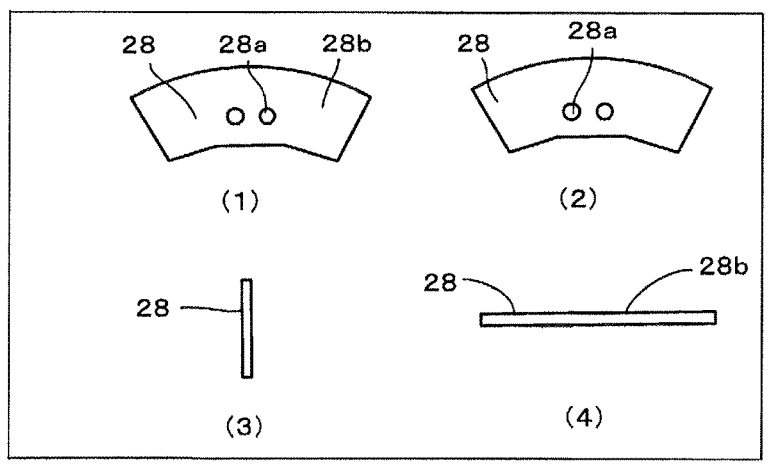
FIG. 17(c) illustrates views of an adjustment member; (1) in FIG. 17(c) is a front view, (2) in FIG. 17(c) is a rear view, (3) in FIG. 17(c) is a side view, and (4) in FIG. 17(c) is a plan view.
Figure 18A:
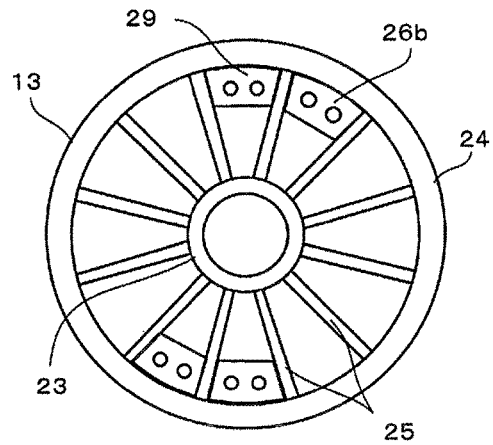
FIG. 18(a) is a front view of an anti-telescoping plate.
Figure 18B:
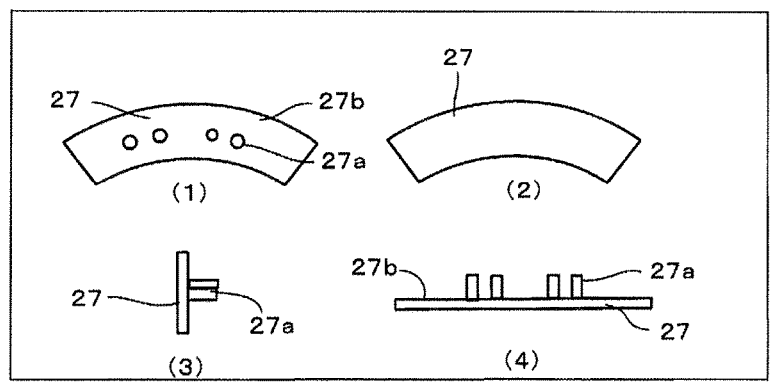
FIG. 18(b) illustrates views of a thrust load adjustment holding member attaching member; (1) in FIG. 18(b) is a front view, (2) in FIG. 18(b) is a rear view, (3) in FIG. 18(b) is a side view, and (4) in FIG. 18(b) is a plan view.
Figure 18C:
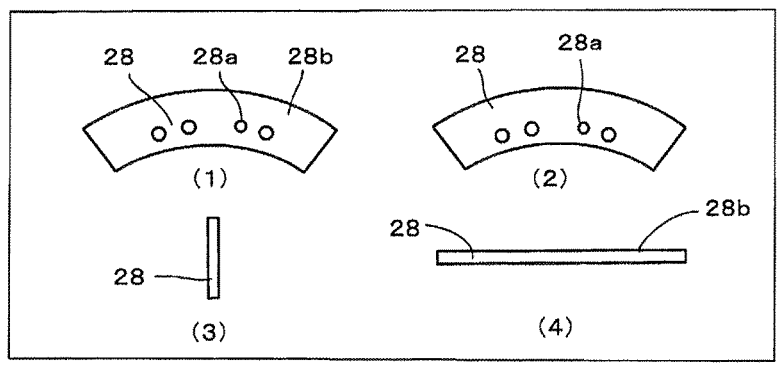
FIG. 18(c) illustrates views of an adjustment member; (1) in FIG. 18(c) is a front view, (2) in FIG. 18(c) is a rear view, (3) in FIG. 18(c) is a side view, and (4) in FIG. 18(c) is a plan view.
Figures 19A, 19B:
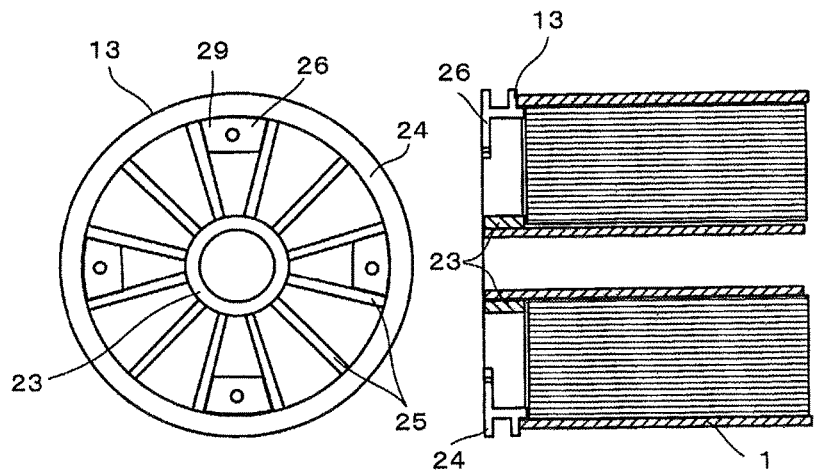
FIG. 19(a) is a front view of an anti-telescoping plate.
FIG. 19(b) is a partial sectional view of a separation membrane element.
Figure 19C:
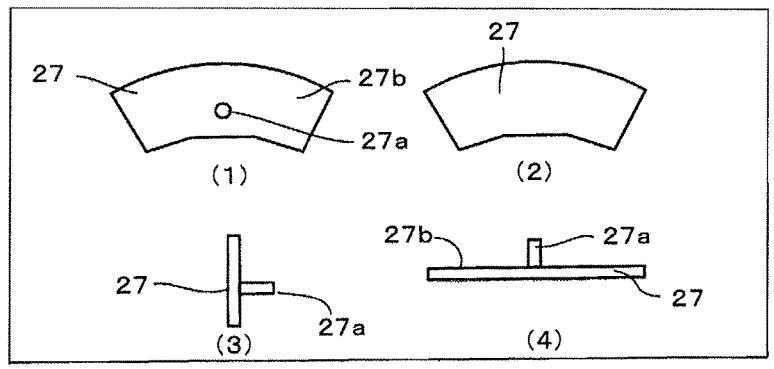
FIG. 19(c) illustrates views of a thrust load adjustment holding adjustment member attaching member; (1) in FIG. 19(c) is a front view, (2) in FIG. 19(c) is a rear view, (3) in FIG. 19(c) is a side view, and (4) in FIG. 19(c) is a plan view.
Figure 19D:
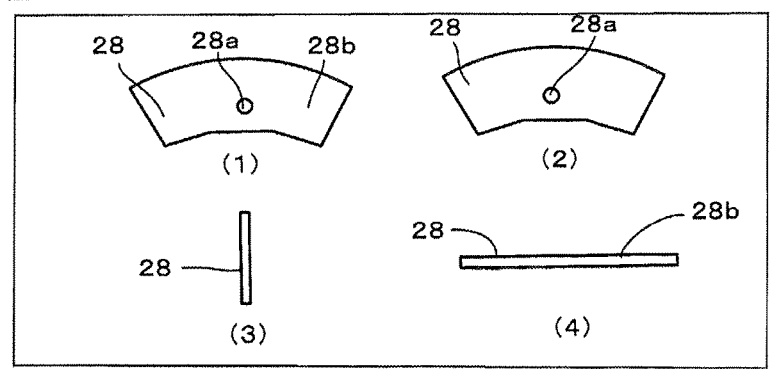
FIG. 19(d) illustrates views of an adjustment member; (1) in FIG. 19(d) is a front view, (2) in FIG. 19(d) is a rear view, (3) in FIG. 19(d) is a side view, and (4) in FIG. 19(d) is a plan view.
Figure 21A:
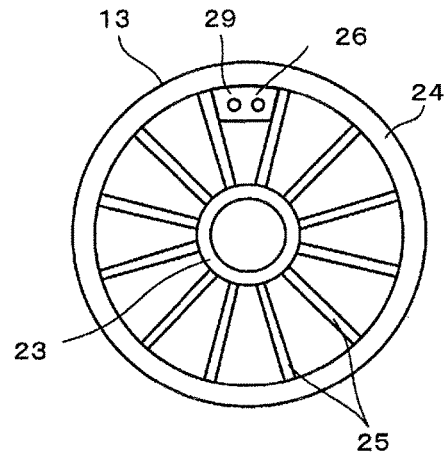
FIG. 21(a) is a front view of an anti-telescoping plate.
Figure 21B:
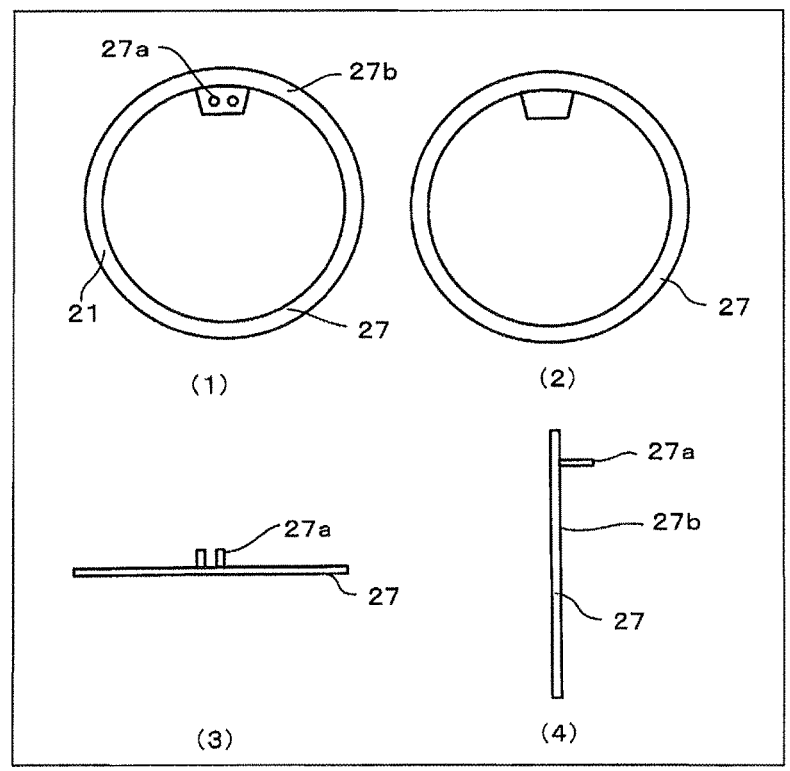
FIG. 21(b) illustrates views of a thrust load adjustment holding member attaching member; (1) in FIG. 21(b) is a front view, (2) in FIG. 21(b) is a rear view, (3) in FIG. 21(b) is a side view, and (4) in FIG. 21(b) is a plan view.

For example, an individual thrust load adjustment holding member mounting section 26a may be employed such that the thrust load adjustment holding member attachment mounting section 27a of the thrust load adjustment holding member attaching member 27 is interposed in and fixed to an individual spoke 25 as illustrated in the third example in FIG. 17 or a transverse spoke thrust load adjustment holding member mounting section 26b may be employed so as to straddle the plurality of spokes 25 as illustrated in the fourth example in FIG. 18.

(2) In the examples described above, an example, in which the total length adjustment member fixing section 29 of one spoke 25 has two mounting holes, is described; however, there is no particular limitation on the shape thereof as long as the total length adjustment member fixing section is engaged with the thrust load adjustment holding member attachment mounting section 27a. For example, the shape may not be the same as the shape of the mounting hole as in the third example, or one mounting hole may be provided as in the fifth example illustrated in FIG. 19. In addition, the mounting hole may be provided in the spoke 25 itself as in the sixth example illustrated in FIG. 20.

(3) In the examples described above, an example, in which the thrust load adjustment holding members 21 are mounted in the total length adjustment member fixing section 29 provided at four positions of the anti-telescoping plate 13, respectively, is illustrated; however, as long as the thrust load adjustment holding member 21 can be firmly fixed to the total length adjustment member fixing section 29 and can come into close contact with the outer ring 24 of the anti-telescoping plate 13, there is no particular limitation on a mounting method thereof or the shape of the thrust load adjustment holding member 21. For example, as in the seventh example illustrated in FIG. 21, the ring-shaped (hollow disk-shaped) thrust load adjustment holding member 21 or the thrust load adjustment holding member attaching member 27 can be attached to the total length adjustment member fixing section 29 at one position.

(4) In the examples described above, the thrust load adjustment holding member 21 is disposed on the upstream side in the pressure vessel 2; however, it is also possible to dispose the thrust load adjustment holding member on the downstream side in the pressure vessel 2 and it is also possible to perform adjustment when the separation membrane elements 1 are loaded from the downstream side.

The present application is based on Japanese Patent Application No. 2013-191601 filed on Sep. 17, 2013, the entire content of which is incorporated herein by reference.

A separation membrane module and an operation method thereof, a separation membrane element, a thrust load holding member and a thrust load adjustment holding member according to the present invention can be applied to various separation treatment devices using a separation membrane.

DESCRIPTION OF REFERENCE NUMERALS AND SIGNS

1 separation membrane element
2 pressure vessel
2a end plate
3 pump
4 interconnection member
5 permeated liquid adaptor
6 permeated liquid discharge piping
7, 22 thrust load holding member
8 movement preventive member
9 separation membrane
9a wound membrane body
10 permeated liquid channel member
11 liquid-to-be-treated channel member
12 permeated liquid collection tube
13 anti-telescoping plate
14 brine seal
15 separation membrane module
16 liquid-to-be-treated feed port
17 concentrated liquid discharge port
18 seal member
19 liquid-to-be-treated feed side pressure vessel adaptor
20 permeated liquid discharge-side pressure vessel adaptor
21 thrust load adjustment holding member
23 inner ring
24 outer ring
25 spoke
26 total length adjustment member mounting section
26a individual thrust load adjustment holding member mounting section
26b transverse spoke thrust load adjustment holding member mounting section
27 thrust load adjustment holding member attachment member
27a thrust load adjustment holding member attachment mounting section
27b thrust load adjustment holding member attachment facing section
28 adjustment member
28a adjustment member mounting section
28b adjustment member facing section
29 total length adjustment member fixing section

The invention claimed is:
1. A separation membrane module comprising:
a pressure vessel having a liquid-to-be-treated feed port on one end thereof and a concentrated liquid discharge port on the other end thereof;
a plurality of separation membrane elements which are provided in the pressure vessel and each comprises:
a wound membrane body in which a separation membrane, a liquid-to-be-treated channel member and a permeated liquid channel member are spirally wound around a permeated liquid collection tube;
an anti-telescoping plate disposed on the liquid-to-be-treated feed port-side; and
an anti-telescoping plate disposed on the concentrated liquid discharge port-side; and
a thrust load holding member disposed on the liquid-to-be-treated feed port-side and a thrust load holding member disposed on the concentrated liquid discharge port-side, wherein the thrust load holding members hold a thrust load generated when water passes through the separation membrane elements,
wherein the thrust load holding member disposed on the concentrated liquid discharge port-side is arranged so that one end thereof contacts with an end plate of the pressure vessel which is disposed on the concentrated liquid discharge port-side, and the other end thereof contacts with the anti-telescoping plate disposed on the concentrated liquid discharge port-side, a thrust load adjustment holding member which is capable of adjusting the thrust load by adjusting a total length of the separation membrane elements in the pressure vessel, is provided to the thrust load holding member disposed on the liquid-to-be-treated feed port-side, wherein the thrust load holding member disposed on the liquid-to-be-treated feed port-side and the thrust load adjustment holding member are arranged so as to satisfy at least one of the following relationship (1) to (4):

(1) one end of the thrust load holding member disposed on the liquid-to-be-treated feed port-side contacts with an end plate of the pressure vessel which is disposed on the liquid-to-be-treated feed port-side, and the thrust load adjustment holding member is arranged so as to fill a gap between the other end of the thrust load holding member disposed on the liquid-to-be-treated feed port-side and the anti-telescoping plate disposed on the liquid-to-be-treated feed port-side;

(2) one end of the thrust load holding member disposed on the liquid-to-be-treated feed port-side contacts with the anti-telescoping plate disposed on the liquid-to-be-treated feed port-side, and the thrust load adjustment holding member is arranged so as to fill a gap between the other end of the thrust load holding member disposed on the liquid-to-be-treated feed port-side and the end plate of the pressure vessel which is disposed on the liquid-to-be-treated feed port-side;

(3) one end of the thrust load holding member disposed on the liquid-to-be-treated feed port-side contacts with a pressure vessel adaptor disposed to the end plate of the pressure vessel which is disposed on the liquid-to-be-treated feed port-side, and the thrust load adjustment holding member is arranged so as to fill a gap between the other end of the thrust load holding member disposed on the liquid-to-be-treated feed port-side and the anti-telescoping plate disposed on the liquid-to-be-treated feed port-side; and (4) one end of the thrust load holding member disposed on the liquid-to-be-treated feed port-side contacts with the anti-telescoping plate disposed on the liquid-to-be-treated feed port-side, and the thrust load adjustment holding member is arranged so as to fill a gap between the other end of the thrust load holding member disposed on the liquid-to-be-treated feed port-side and the pressure vessel adaptor disposed to the end plate of the pressure vessel which is disposed on the liquid-to-be-treated feed port-side, and the thrust load holding member disposed on the liquid-to-be-treated feed port-side and the thrust load holding member disposed on the concentrated liquid discharge port-side hold loads transmitted from an outer ring of the anti-telescoping plate disposed on the liquid-to-be-treated feed port-side and an outer ring of the anti-telescoping plate disposed on the concentrated liquid discharge port-side, on a separation membrane element side.

2. The separation membrane module according to claim 1, wherein the thrust load holding member disposed on the liquid-to-be-treated feed port-side transmits the thrust load of the separation membrane element to an end plate of the pressure vessel through the thrust load adjustment holding member.

3. The separation membrane module according to claim 1, wherein the thrust load holding member transmits the thrust load of the separation membrane element to a pressure vessel adaptor provided on an end plate of the pressure vessel through the thrust load adjustment holding member.

4. The separation membrane module according to claim 3, wherein the thrust load holding member has any shape selected from a hollow polygonal column shape, a cylindrical shape and a cone shape without an apex portion thereof.

5. The separation membrane module according to claim 4, wherein the thrust load holding member holds a load transmitted from an outer ring of the anti-telescoping plate of the separation membrane element, on a separation membrane element side.

6. The separation membrane module according to claim 5, wherein the thrust load adjustment holding member has a hollow polygonal plate shape or a hollow disk shape, and is formed of a plurality of members which are mountable on the telescoping plate of the separation membrane element.

7. A method for operating a separation membrane module, in which a liquid to be treated is fed to the separation membrane module according to claim 5 from a liquid-to-be-treated feed port and is treated through the separation membrane, permeated liquid is discharged from a permeated liquid discharge port, and concentrated liquid is discharged from a concentrated liquid discharge port, the method comprising:

a step of disposing the thrust load holding member and the thrust load adjustment holding member on at least an upstream side in the pressure vessel;

a step of adjusting the thrust load by adjusting the length of either the separation membrane elements or thrust load holding members for the transmission of the thrust load from the anti-telescoping plates to the thrust load holding adjustment member and thrust load holding members;

a step of feeding a flushing liquid from the concentrated liquid discharge port; and a step of performing flushing in which the flushing liquid is discharged from the liquid-to-be-treated feed port.

8. The separation membrane module according to claim 1, wherein the thrust load adjustment holding member has a hollow polygonal plate shape or a hollow disk shape, and is formed of a plurality of members which are mountable on the telescoping plate of the separation membrane element.

9. A method for operating a separation membrane module, in which a liquid to be treated is fed to the separation membrane module according to claim 1 from a liquid-to-be-treated feed port and is treated through the separation membrane, permeated liquid is discharged from a permeated liquid discharge port, and concentrated liquid is discharged from a concentrated liquid discharge port, the method comprising:

a step of disposing the thrust load holding member and the thrust load adjustment holding member on at least an upstream side in the pressure vessel;

a step of adjusting the thrust load by adjusting the length of either the separation membrane elements or thrust load holding members for the transmission of the thrust load from the anti-telescoping plates to the thrust load holding adjustment member and thrust load holding members;

a step of feeding a flushing liquid from the concentrated liquid discharge port; and a step of performing flushing in which the flushing liquid is discharged from the liquid-to-be-treated feed port.

10. A separation membrane module comprising a plurality of separation membrane elements loaded in a pressure vessel, wherein each of the separation membrane elements comprises:
a wound membrane body in which a separation membrane, a liquid-to-be-treated channel member and a permeated liquid channel member are spirally wound around a permeated liquid collection tube; and
anti-telescoping plates disposed on both ends of the wound membrane body,
wherein the anti-telescoping plate has an inner ring and an outer ring, and a plurality of spokes extending radially from the inner ring to an outer side, wherein the outer ring is adjacent to each of the plurality of spokes, and
wherein the separation membrane module has a thrust load adjustment holding member mounting section on which a thrust load adjustment holding member is mountable, wherein the thrust load adjustment holding member comes into close contact with an outer ring of one of the anti-telescoping plates and which is capable of adjusting a thrust load generated when water passes through the separation membrane elements by adjusting a total length of the separation membrane elements.

11. The separation membrane module according to claim 10, wherein at least one of the spokes has an individual thrust load adjustment holding member mounting section which enables the individual spoke to hold the thrust load adjustment holding member.

12. The separation membrane module according to claim 11, wherein the thrust load adjustment holding member mounting section has at least one mounting hole.

13. The separation membrane module according to claim 10, wherein two or more of the spokes have a transverse spoke thrust load adjustment holding member mounting section which enables the plurality of spokes to hold the thrust load adjustment holding member.

14. The separation membrane module according to claim 13, wherein the thrust load adjustment holding member mounting section has at least one mounting hole.

15. A separation membrane module comprising:
a plurality of separation membrane elements which are provided in a pressure vessel having a liquid-to-be-treated feed port on one end thereof and a concentrated liquid discharge port on the other end thereof, wherein each of the plurality of separation membrane elements comprises:
a wound membrane body in which a separation membrane, a liquid-to-be-treated channel member and a permeated liquid channel member are spirally wound around a permeated liquid collection tube; and
anti-telescoping plates, wherein the anti-telescoping plates comprise an anti-telescoping plate disposed at one end of the wound membrane body on the liquid-to-be-treated feed port-side, and an anti-telescoping plate disposed on the other end of the wound membrane body on the concentrated liquid discharge port-side,
the separation membrane module further comprising:
a thrust load adjustment holding member arranged between a permeated liquid adaptor connected with the separation membrane element on the liquid-to-be-treated feed port-side and a pressure vessel adaptor disposed to the pressure vessel,
a thrust load holding member disposed on the liquid-to-be-treated feed port-side, and a thrust load holding member disposed on the concentrated liquid discharge port-side, wherein the thrust load holding members hold a thrust load generated when water passes through the separation membrane elements,
wherein the thrust load holding member disposed on the concentrated liquid discharge port-side is arranged so that one end thereof contacts with an end plate of the pressure vessel which is disposed on the concentrated liquid discharge port-side, and the other end thereof contacts with the anti-telescoping plate disposed on the concentrated liquid discharge port-side,
wherein one end of the thrust load holding member disposed on the liquid-to-be-treated feed port-side contacts with the anti-telescoping plate disposed on the liquid-to-be-treated feed port-side, and the thrust load adjustment holding member is arranged so as to fill a gap between the other end of the thrust load holding member disposed on the liquid-to-be-treated feed port-side and the pressure vessel adaptor disposed to the end plate of the pressure vessel which is disposed on the liquid-to-be-treated feed port-side,
wherein the thrust load of the separation membrane elements is received by an outer ring of the anti-telescoping plate disposed on the liquid-to-be-treated feed port-side, and the thrust load transmits to the pressure vessel adaptor provided on an end plate of the pressure vessel.

16. The separation membrane module according to claim 15, which has any shape selected from a hollow polygonal column shape, a cylindrical shape and a cone shape without an apex portion thereof.

17. A separation membrane module comprising:
a pressure vessel;
a plurality of separation membrane elements which are provided in the pressure vessel and each comprises:
a wound membrane body in which a separation membrane, a liquid-to-be-treated channel member and a permeated liquid channel member are spirally wound around a permeated liquid collection tube; and
anti-telescoping plates disposed on both ends of the wound membrane body; and
a thrust load holding member which holds a thrust load generated when water passes through the separation membrane elements,
a thrust load adjustment holding member mounted between at least one end of the thrust load holding member in an axial direction of the separation membrane elements and one of the anti-telescoping plates, and adjusts the thrust load by adjusting a total length of the separation membrane elements in the pressure vessel.

18. The separation membrane module according to claim 17, wherein the thrust load adjustment holding member has a hollow polygonal plate shape or a hollow disk shape.

* * * * *